United States Patent
Jeon et al.

(10) Patent No.: US 10,608,837 B2
(45) Date of Patent: Mar. 31, 2020

(54) CONTROL APPARATUS AND METHOD FOR CONTROLLING THE SAME

(71) Applicant: Samsung Electronics Co., Ltd., Suwon-si, Gyeonggi-do (KR)

(72) Inventors: Ji Hyun Jeon, Suwon-si (KR); Hye Jung Chang, Seoul (KR); Young Sun Shin, Seongnam-si (KR); Kwang Seok Kang, Seongnam-si (KR); Hyun Cheol Oh, Suwon-si (KR); Sun Young Seo, Seoul (KR); Ji Yoon Yoon, Seoul (KR); Eun Kyung Hong, Anyang-si (KR); So Young Yun, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 468 days.

(21) Appl. No.: 15/109,961

(22) PCT Filed: Jan. 6, 2015

(86) PCT No.: PCT/KR2015/000109
§ 371 (c)(1),
(2) Date: Jul. 6, 2016

(87) PCT Pub. No.: WO2015/102469
PCT Pub. Date: Jul. 9, 2015

(65) Prior Publication Data
US 2016/0330040 A1    Nov. 10, 2016

(30) Foreign Application Priority Data
Jan. 6, 2014   (KR) .................. 10-2014-0001555

(51) Int. Cl.
*G06F 3/048*    (2013.01)
*G06F 3/0481*   (2013.01)
(Continued)

(52) U.S. Cl.
CPC ............ *H04L 12/282* (2013.01); *G06F 3/048* (2013.01); *G06F 3/0481* (2013.01);
(Continued)

(58) Field of Classification Search
CPC .......................... G06F 3/04883; G06F 1/1626
See application file for complete search history.

(56) References Cited

U.S. PATENT DOCUMENTS

| | | | |
|---|---|---|---|
| 7,653,212 B2 | 1/2010 | Haughawout et al. | |
| 2001/0041982 A1* | 11/2001 | Kawasaki | G10L 15/26 704/275 |

(Continued)

FOREIGN PATENT DOCUMENTS

| | | |
|---|---|---|
| CN | 102710473 A | 10/2012 |
| CN | 103139371 A | 6/2013 |

(Continued)

OTHER PUBLICATIONS

Chinese Office Action dated Jul. 3, 2019, issued in Chinese Patent Application No. 201580002411.7.
(Continued)

*Primary Examiner* — Rayeez R Chowdhury
(74) *Attorney, Agent, or Firm* — Jefferson IP Law, LLP

(57) ABSTRACT

The present invention relates to a control device for controlling an operation of at least one electric device. The control device includes a user interface unit configured to display a first screen having an icon corresponding to the at least one electric device and a state window of the at least one electric device, and receive an operation command for the at least one electric device; and a control unit configured to, when an icon of any one electric device is selected, perform control such that a control screen for controlling the selected any one electric device is displayed on the user interface, and when a state window of any one electric (Continued)

device is selected, perform control such that a current operation of the selected any one electric device is switched. It is possible to allow easy identification by utilizing icons to display a plurality of home electric devices and it is also possible to check operation states of the home electric devices by utilizing speech bubbles to display the operation states of the electric devices in the vicinity of the icons.

11 Claims, 31 Drawing Sheets

(51) Int. Cl.
    *H04L 12/28*     (2006.01)
    *H04L 12/12*     (2006.01)
    *G06F 3/0482*     (2013.01)
    *G06F 3/0484*     (2013.01)
    *G06F 3/0488*     (2013.01)

(52) U.S. Cl.
    CPC ........ *G06F 3/0482* (2013.01); *G06F 3/04817* (2013.01); *G06F 3/04847* (2013.01); *G06F 3/04883* (2013.01); *H04L 12/12* (2013.01)

(56) References Cited

U.S. PATENT DOCUMENTS

| | | | |
|---|---|---|---|
| 2006/0010394 A1* | 1/2006 | Chaudhri | B60K 35/00 |
| | | | 715/779 |
| 2006/0259184 A1 | 11/2006 | Hayes et al. | |
| 2007/0101288 A1* | 5/2007 | Forstall | G06F 3/04817 |
| | | | 715/781 |
| 2008/0233546 A1* | 9/2008 | Baker | G09B 5/06 |
| | | | 434/169 |
| 2009/0140057 A1* | 6/2009 | Leen | G05D 23/1905 |
| | | | 236/49.3 |
| 2011/0191718 A1* | 8/2011 | Hinckley | G06F 3/033 |
| | | | 715/835 |
| 2011/0287747 A1 | 11/2011 | Matsumoto | |
| 2011/0292283 A1* | 12/2011 | Stephens | G06Q 50/01 |
| | | | 348/563 |
| 2012/0038626 A1* | 2/2012 | Kim | H04N 13/183 |
| | | | 345/419 |
| 2012/0271471 A1 | 10/2012 | Lee et al. | |
| 2012/0316984 A1 | 12/2012 | Glassman | |
| 2013/0179819 A1 | 7/2013 | Jung et al. | |
| 2014/0098247 A1* | 4/2014 | Rao | H04W 4/20 |
| | | | 348/207.1 |
| 2014/0188463 A1* | 7/2014 | Noh | G10L 15/00 |
| | | | 704/201 |
| 2014/0257532 A1* | 9/2014 | Kim | G05B 15/02 |
| | | | 700/90 |
| 2014/0365019 A1* | 12/2014 | Gourlay | G05D 23/1905 |
| | | | 700/278 |
| 2015/0154976 A1* | 6/2015 | Mutagi | H04L 12/281 |
| | | | 704/275 |

FOREIGN PATENT DOCUMENTS

| | | |
|---|---|---|
| CN | 104020733 A | 9/2014 |
| EP | 2 703 974 A1 | 3/2014 |
| KR | 10-2012-0005315 A | 1/2012 |
| KR | 10-2012-0014076 A | 2/2012 |

OTHER PUBLICATIONS

Ohinese Office Action with English translation dated Nov. 20, 2018; Chinese Appln No. 201580002411.7.

* cited by examiner (a)

(b)

CONTROL APPARATUS AND METHOD FOR CONTROLLING THE SAME

TECHNICAL FIELD

The present invention relates to a control device for monitoring and controlling home appliances and a method for controlling the same.

BACKGROUND ART

Recently, along with the rapid development of wired/wireless data communication technology and the broad distribution of communication networks, high-speed communication services such as the Internet have been widely popularized. In particular, as high-speed Internet service has been provided in households, conventional PC-based network technology has developed into home network technology for remotely controlling digital home appliances.

A home network system is a system for connecting digital home appliances, sensors, light fixtures, heating and cooling devices, gas devices, and so on over a wired or wireless local area network to control appliances desired by a user anywhere at any time.

Such a home network system typically includes a home server (or a home monitoring gateway) that functions as a master, a plurality of home network devices (hereinafter referred to as control target devices) that are monitored and controlled by the home server, and a controller that locally or remotely monitors and controls a plurality of control target devices through a connection with only the home server.

In this case, the home server is generally implemented on a residential gateway (RG) or a wall pad, and a controller is generally implemented in a wall pad, a TV, a cell phone, a computer, etc. The home server and the controller may be integrated and implemented as one device. For example, a TV may serve as the control device in addition to the home server.

In the home network system, the home server may automatically recognize control target devices, for example, a TV, a refrigerator, a lamp, a microwave, a sensor, a boiler, and a washing machine, which are connected to a home network through various physical media (e.g., a power line, a serial communication such as RS-232, Ethernet, etc.), and may display the recognized home network devices on a screen to control devices desired to be controlled by a user.

The controller monitors and controls a plurality of control target devices through communication with the home server.

In the home network system, the home server transmits data to or receives data from an external network, which is mainly implemented as an Internet network.

The user uses a control device such as a PC, a notebook, a smartphone, a tablet PC, a TV, a wearable device, and various remote controllers to access the home server located inside or outside the home and then access a plurality of home appliances connected to the home network inside the home.

In addition, when a plurality of electric devices are registered with an external server, the user accesses the plurality of electric devices registered with the external server via the external server, irrespective of the home server.

When the user uses the control device to monitor and control the control target devices inside the home, the use should select one of the control target devices, access the selected control target device over a network, perform authentication, and then monitor or control the control target device. Thus, it is difficult for the user to use the control device.

For example, home appliances such as an air conditioner or air cleaner for conditioning an air and a humidifier for adjusting humidity are usually controlled together. In this case, the user should inconveniently and inefficiently issue an operation control command to each electric device.

DISCLOSURE

Technical Problem

One aspect provides a control device configured to display an icon of a home electric device and a state window that displays an operation state of the home electric device when an app for a home network is executed, display a control screen when the icon is touched, and transmit an on/off control command to the electric device when the state window is touched, and a control method thereof.

Another aspect provides a control device including an overview unit having an icon of a home electric device, a speech bubble configured to display an operation state of the home electric device, and a movement button for laterally moving a screen on which the icon is displayed when an app for a home network is executed, and a control method thereof.

Still another aspect provides a control device including a master key having a plurality of buttons for integrally controlling home electric devices on the basis of a predetermined operation command when an app for a home network is executed, and a control method thereof.

Yet another aspect provides a control device including a chatting unit configured to chat with a home electric device using a shortcut button for which a chatting word is predetermined when an app for a home network is executed, and a control method thereof.

Technical Solution

In accordance with an aspect, a control device for controlling an operation of at least one electric device includes a user interface unit configured to display a first screen having an icon corresponding to the at least one electric device and a state window of the at least one electric device, and receive an operation command of the at least one electric device; and a control unit configured to, when an icon of any one electric device is selected, perform control such that a control screen for controlling the selected electric device is displayed on the user interface unit, and when a state window of the any one electric device is selected, perform control such that a current operation of the any one electric device is switched.

The state window may include a speech bubble in which an operation state of the any one electric device changes in response to the selection.

The state window may include a sliding switch in which an operation state of the any one electric device changes in response to a sliding touch input.

The control device may further include a storage unit configured to store information of the at least one electric device and an app for monitoring and controlling the at least one electric device.

The control device may further include a communication unit configured to communicate with the at least one electric device.

The control device may further include a communication unit configured to communicate with another control device, in which the control unit controls an operation of the at least one electric device based on an operation command transmitted by the other control device.

The control unit may recognize an electric device from an image acquired through a camera and perform control such that a control screen for controlling the recognized electric device is displayed.

The control unit may perform control such that the control screen is displayed to overlap the acquired image.

The first screen may include an overview unit on which the icon and the state window of the at least one electric device are displayed, and when the icon is selected, the control unit may perform control such that a mini control window is displayed to overlap the overview unit.

In accordance with another aspect, a control method of a control device includes displaying an icon and a state window of at least one electric window in a first screen displayed in a user interface unit, when a state window of any one electric device is selected, performing simple control for switching an operation of the selected any one electric device, and when an icon of any one electric device is selected, displaying a control screen for performing detailed control of the selected any one electric device on the user interface unit.

The control method may further include, when the state window of the electric device is selected in a first display state, switching the selected state window to a second display state.

The performing of the simple control of the any one electric device may include, when the state window of the any one electric device is touched in the first display state, transmitting an operation command corresponding to the second display state to the any one electric device.

The control method may further include, when an operation command of at least one electric device is transmitted from an external device, determining whether the operation command is a simple control signal or a detail control signal, when the operation command is the simple control signal, changing a state window of the at least one electric device and transmitting an operation switching signal corresponding to the changed state window to the at least one electric device; and when the operation command is the detailed control signal, displaying a control screen for controlling the at least one electric device and transmitting a selected operation control signal to the at least one electric device.

The control method may further include acquiring a home image when a camera viewfinder mode is input, recognizing an electric device from the acquired image, and displaying a control screen for controlling the recognized electric device, and displaying the control screen over the acquired image.

Advantageous Effects

According to an embodiment, it is possible to easily control an operation of an electric device by displaying an icon of a home electric device and a state window that displays an operation state of the electric device and using the icon and the state window to control an operation of the electric device.

It is also possible to allow easy identification by utilizing icons to display a plurality of home electric devices, and it is also possible to check operation states of the home electric devices by utilizing speech bubbles to display the operation states of the electric devices in the vicinity of the icons. That is, it is possible to provide convenience to the user.

In addition, since the operation state of the electric device may be changed only by touching an icon, it is possible to easily control the operation of the electric device and integrally control electric devices at the same time using a plurality of buttons of a master key, thus enhancing convenience and efficiency of control of the electric device. It is also possible to rapidly and easily check the state information of the electric device by utilizing a pop-up window to output an event in which the state of the electric device is changed.

Furthermore, it is also possible to simply and easily transmit an operation command to at least one electric device using a shortcut button of a chatting unit.

MODES OF THE INVENTION

Hereinafter, embodiments of the present invention will be described in detail with reference to the accompanying drawings.

Figure 1:
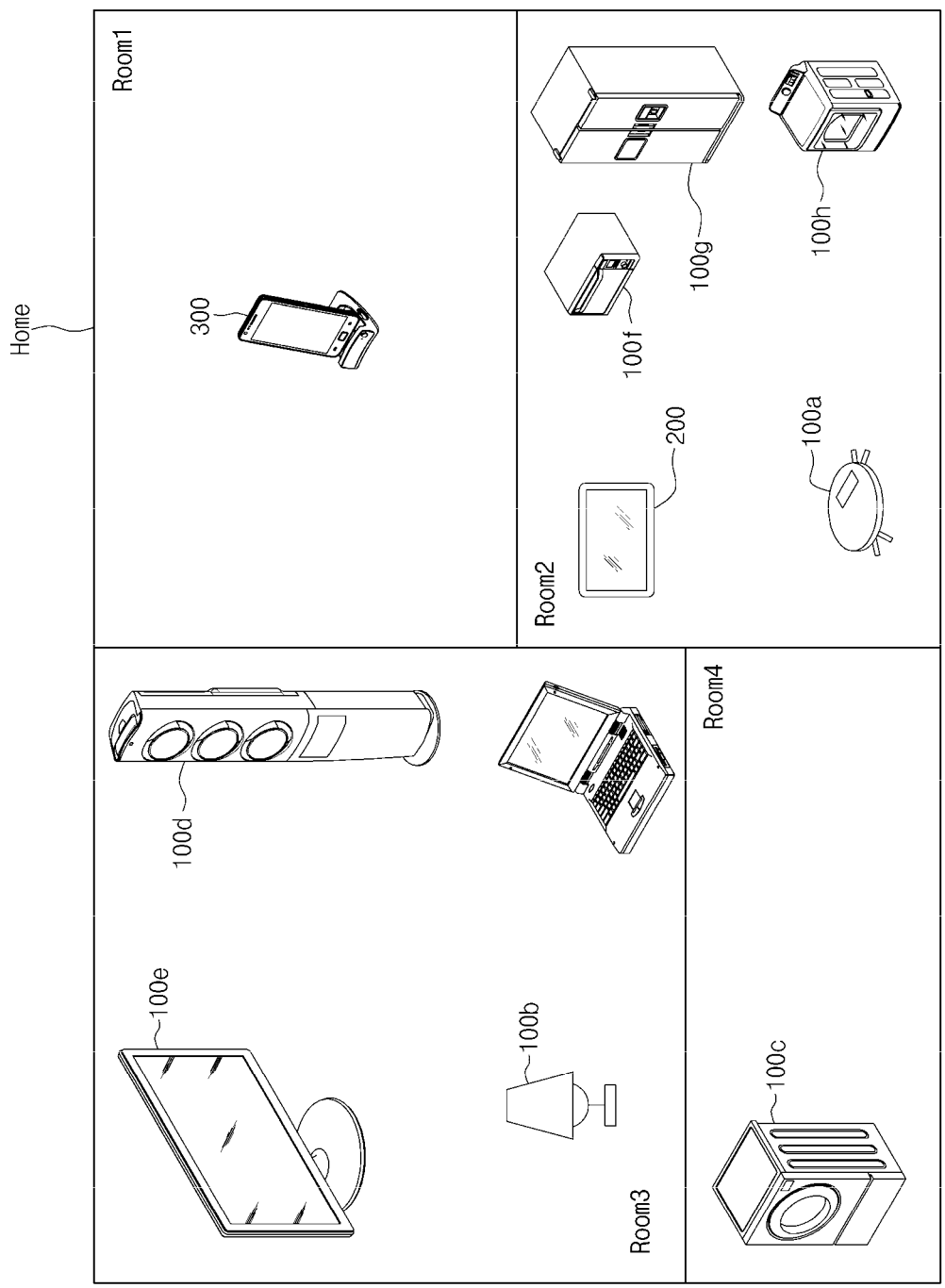
FIG. 1 is an exemplary diagram showing a home network system that communicates with a control device according to an embodiment.
Figure 2:
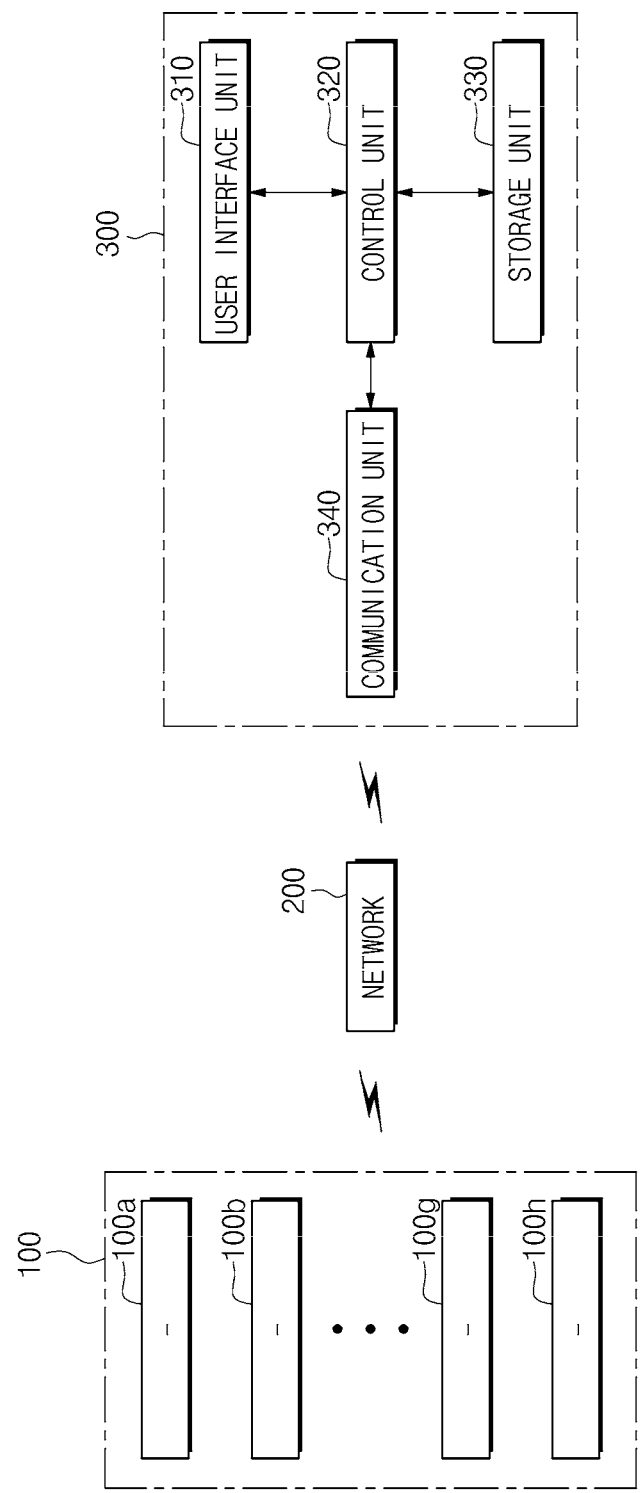
FIG. 2 is a block diagram showing a home network system that communicates with a control device according to an embodiment.

FIG. 1 is an exemplary diagram showing a home network system that communicates with a control device according to an embodiment, and FIG. 2 is a block diagram showing a home network system that communicates with a control device according to an embodiment. The home network system that communicates with the control device includes a plurality of electric devices 100a to 100h and a network.

The electric devices 100a to 110h, each of which is a device that performs a predetermined unique function, transmit operation information corresponding to an operation state by performing an additional function of communicating with the control device over the network, and perform an operation corresponding to an operation command transmitted by the control device. Here, the control device 300 includes a mobile device.

The electric devices include home appliances that are not portable, such as a robot cleaner 100a, a light fixture 100b, a washing machine 100c, an air conditioner 100d, a television 100e, a cooking appliance 100f, a refrigerator 100g, and a dishwasher 100h, and may further include a terminal that is used in the home, such as a notebook, a PC, and a tablet. In addition, the electric devices may further include a security device in which a camera and a microphone are provided.

A network 200 is a home network that enables bidirectional communication by connecting all electric or electronic devices used in the home to one system.

In detail, the network 200 may allow information to be shared between the plurality of electric devices and the control device 300 over the wired/wireless Internet.

Home information transfer methods may be classified into a wired scheme and a wireless scheme. Examples of the wired scheme include a home phoneline networking alliance (PNA) using an existing telephone line, IEEE 1394, a power line, etc. Examples of the wireless scheme include home radio frequency (RF), Bluetooth, Infrared Data Association (IrDA) and wireless LAN (e.g., WiFi), Zigbee, Z-wave, and a short-range communication (e.g., NFC, etc.).

The network 200 includes a home server that manages and controls the plurality of electric devices.

The home server may be implemented on a residential gateway (RG), a wall pad, or a TV.

The home server may be implemented in software and provided in various electric devices or various mobile devices in the home. In addition the home server may be implemented in hardware and combined with various electric devices or various mobile devices in the home.

That is, the home server displays operation states of the plurality of electric devices in the home, receives an operation command for at least one of the plurality of electric devices from a user, and then transmits the operation command to the at least one electric device.

The control device 300 communicates with at least one of the plurality of electric devices through wired or wireless communication.

In addition, the control device 300 may communicate with each of the plurality of electric devices in the home, and may transmit or receive information of the plurality of electric devices through communication with the home server.

The control device 300 includes an app for communicating with the home network to monitor and control the plurality of electric devices in the home. When the app is executed by the user, the control device 300 outputs an operation state of at least one of the plurality of electric devices in the home, receives an operation command from the user, and controls an operation of the at least one electric device on the basis of the received operation command.

The control device 300, which is a terminal device movable to the outside of the home such as a smartphone, a tablet PC, a notebook, etc., or a device fixed inside the home such as a TV, various remote controllers, etc., may be a terminal device in which an app provided by a content provider may be installed, and may be a device having an app, software, or firmware built therein when the device is manufactured by a manufacturer.

As shown in FIG. 2, the control device 300 includes a user interface unit 310, a control unit 320, a storage unit 330, and a communication unit 340.

The user interface unit 310 outputs operation states of pre-registered electric devices among the plurality electric devices disposed in the home and receives an operation command of at least one of the pre-registered electric devices.

The user interface unit 310 includes a display unit for displaying the operation states of the pre-registered electric devices and an input unit for receiving the operation command from the user.

Here, the input unit is a touch panel for receiving an operation command, and the user interface unit 310 may be implemented as a touch screen in which a display panel of the display unit and the touch panel of the input unit are integrally formed.

In addition, the input may be received by the input unit through an electronic pen, a pointing device (mouse, etc.), and a keyboard in addition to the touch panel. In this case, the input unit may be formed separately from the display panel of the display unit. However, when the input unit is a touch type electronic pen, the input unit may be formed integrally therewith.

The user interface unit 310 includes a home screen on which icons for various apps are displayed.

The user interface unit 310 displays an icon of an app for monitoring and controlling an electric device on the home screen, transmits an app selection signal to the control unit 320 when the icon of the app is selected by the user, and displays a screen corresponding to execution of the app on the basis of a command of the control unit 320. The screen display configuration of the user interface unit will be described below.

When the app is executed, the control unit 320 controls the user interface unit 310 such that operation states of pre-registered electric devices are output, and controls transmission of a signal corresponding to an operation command of at least one electric device on the basis of an operation command input to the user interface unit 310.

The control configuration of the control unit 320 will be described below in association with the screen display configuration of the user interface unit.

The storage unit 330 stores identification information of home electric devices registered by the user and an app for monitoring and controlling the pre-registered electric devices.

The storage unit 330 stores an operation command for a pre-registered electric device for each button of a master key and stores an operation command for an electric device for each shortcut button of a chatting unit.

The communication unit 340 communicates with the pre-registered electric devices.

Furthermore, the communication unit 340 may also communicate with the home server.

The user interface unit 310 will be described in detail with reference to FIGS. 3 to 20. In addition, a control operation of the control unit 320 will also be described.

Figure 3:
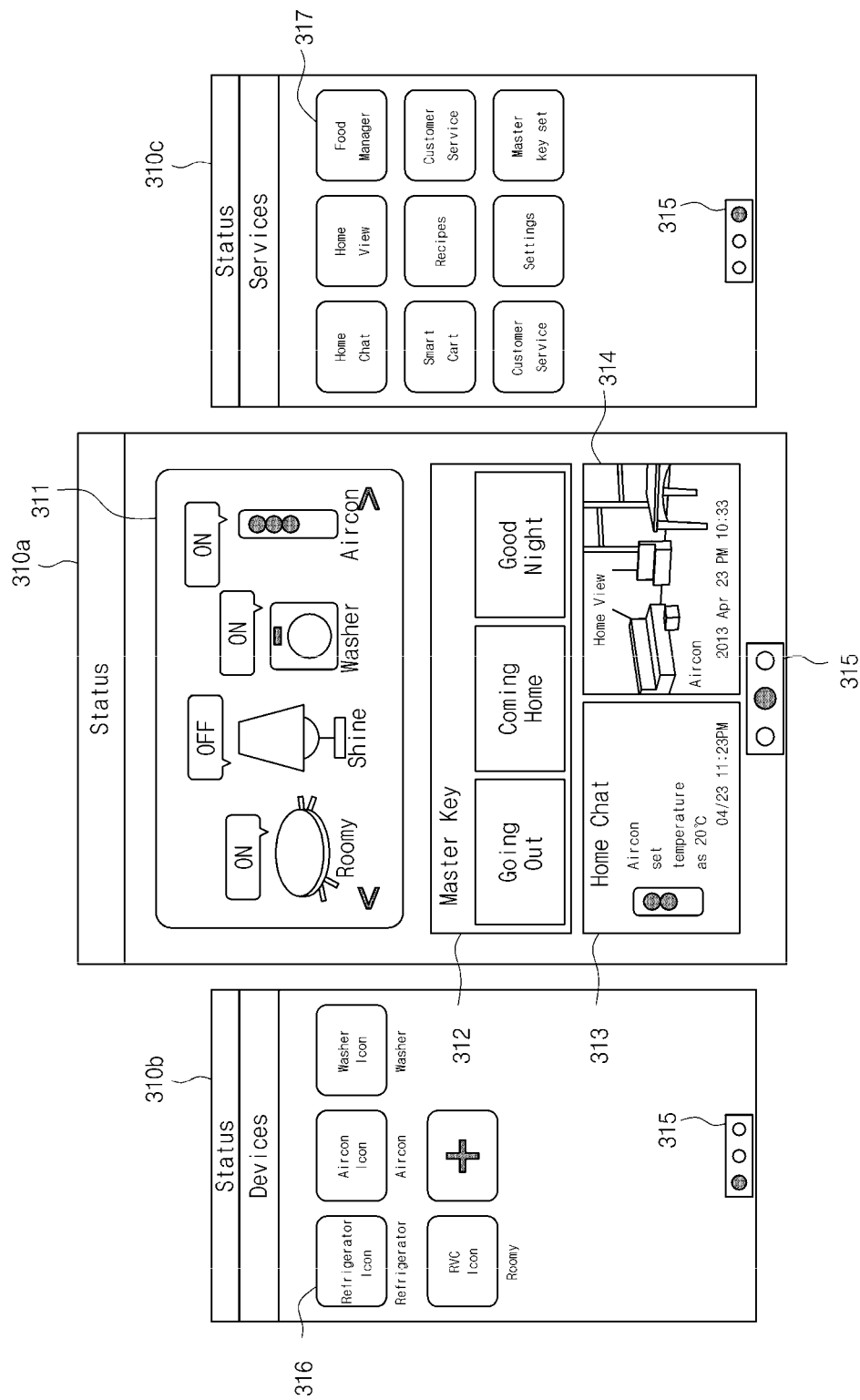
FIG. 3 is an exemplary diagram showing a dashboard screen and a plug-in screen of a control device according to an embodiment.

FIG. 3 is an exemplary diagram showing a dashboard screen and a plug-in screen of a control device according to an embodiment.

When the app is executed, the user interface unit 310 displays a dashboard screen 310a as an initial screen.

Here, the dashboard screen 310a is a screen on which basic information regarding a plurality of electric devices connected through the home network, information for controlling an operation, and so on are displayed.

When a sliding touch is input to the dashboard screen 310a, the user interface unit 310 switches the screen from the dashboard screen 310a to a plug-in screen 310b or 310c.

That is, when a sliding touch applied from left to right is input to the dashboard screen 310a, the user interface unit 310 displays a first plug-in screen 310b on which a device registration item for registering an electric device is displayed. When a sliding touch applied from right to left is input to the dashboard screen 310a, the user interface unit 310 displays a second plug-in screen 310c on which a service item for servicing and setting the electric device is displayed.

In addition, when a sliding touch applied from right to left is input while the first plug-in screen 310b is displayed, the user interface unit 310 displays the dashboard screen 310a.

According to the embodiment, the number of plug-in screens is two, but may be one or three or more.

The control unit 320 checks a screen being displayed, performs switching control such that a screen positioned at the right side of the current screen is displayed when the sliding touch applied from right to left is input, and performs switching control such that a screen positioned at the left side of the current screen is displayed when the sliding touch applied from left to right is input.

For example, when a sliding touch is input while the dashboard screen 310a is displayed, the control unit 320 checks a sliding touch direction. The control unit 320 controls switching to the first plug-in screen 310b when the checked sliding touch direction is from left to right, and controls switching to the second plug-in screen 310c when the checked sliding touch direction is from right to left.

The dashboard screen 310a includes an overview unit 311 for displaying list information and operation information of pre-registered electric devices and widget units 312, 313, and 314 for displaying execution command information and monitoring information for rapidly and easily controlling operations of the pre-registered electric devices.

In addition, the dashboard screen 310a further include a screen switching unit 315 configured to directly switch from the dashboard screen to the plug-in screen, directly switch from the plug-in screen to the dashboard screen, or directly switch from one plug-in screen to another plug-in screen.

The term "direct switching" includes switching the screen through a single touch rather than the sliding touch.

That is, the screen switching unit 315 includes page buttons equal in number to the plurality of screens. The arrangement of the plurality of page buttons corresponds to that of the plurality of screens. A page button corresponding to the position of the currently displayed screen is displayed differently from the remaining page buttons. Thus, the user may recognize the position of the currently displayed screen.

In addition, arrangement information of the plurality of screens may be preset, and the arrangement of the screens may be changed by the user.

For example, the user interface unit according to the embodiment includes a total of three screens, that is, the dashboard screen, the first plug-in screen, and the second plug-in screen. For the arrangement of the three screens, the first plug-in screen is disposed at the left side of the dashboard screen, and the second plug-in screen is disposed at the right side of the dashboard screen.

Thus, there are a total of three page buttons of the screen switching unit 315. Among the three page buttons, a left page button is linked with the first plug-in screen 310b, a center page button is linked with the dashboard screen 310a, and a right page button is linked with the second plug-in screen 310c.

When the left page button is touched, the first plug-in screen 310b is displayed on the user interface unit. In this case, the left page button has a different color from other buttons.

When the center page button is touched, the dashboard screen 310a is displayed on the user interface unit. In this case, the center page button has a different color from other buttons.

When the right page button is touched, the second plug-in screen 310c is displayed on the user interface unit. In this case, the right page button has a different color from other buttons.

That is, the control unit 320 performs control to check the page button touched among the plurality of page buttons of the screen switching unit 315, check a screen corresponding to the checked page button, and display the checked screen on the user interface unit 310.

The first plug-in screen 310b and the second plug-in screen 310c are each a screen for changing setting information of a main function, setting an additional function, or receiving a service.

In detail, the first plug-in screen 310b includes a device check button having registration information regarding a pre-registered electric device and a registration setting button 316 for registering a new device.

The second plug-in screen 310c includes a setting change button for changing settings of a master key, a chatting unit, and a home view unit of a widget unit, a service button for receiving a service for the pre-registered electric device, and a management button 317 for each pre-registered electric device.

Figure 4:
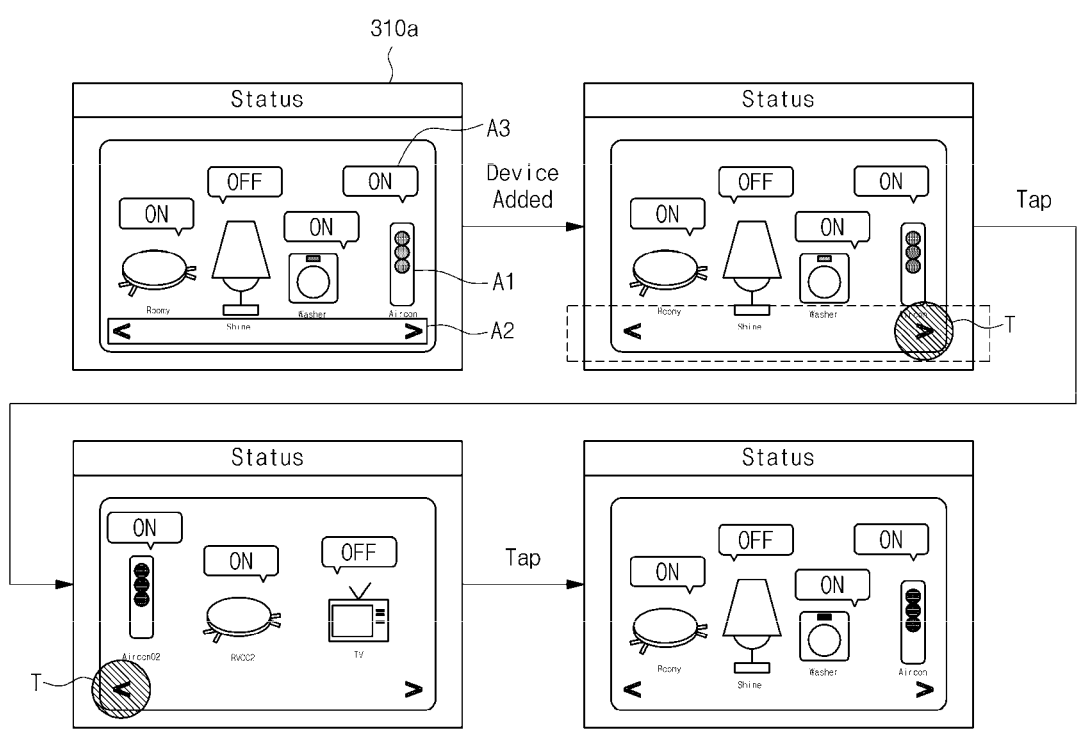
FIGS. 4 to 6 are exemplary diagrams showing an execution of an overview unit in a dashboard screen of a control device according to an embodiment.
Figure 5:
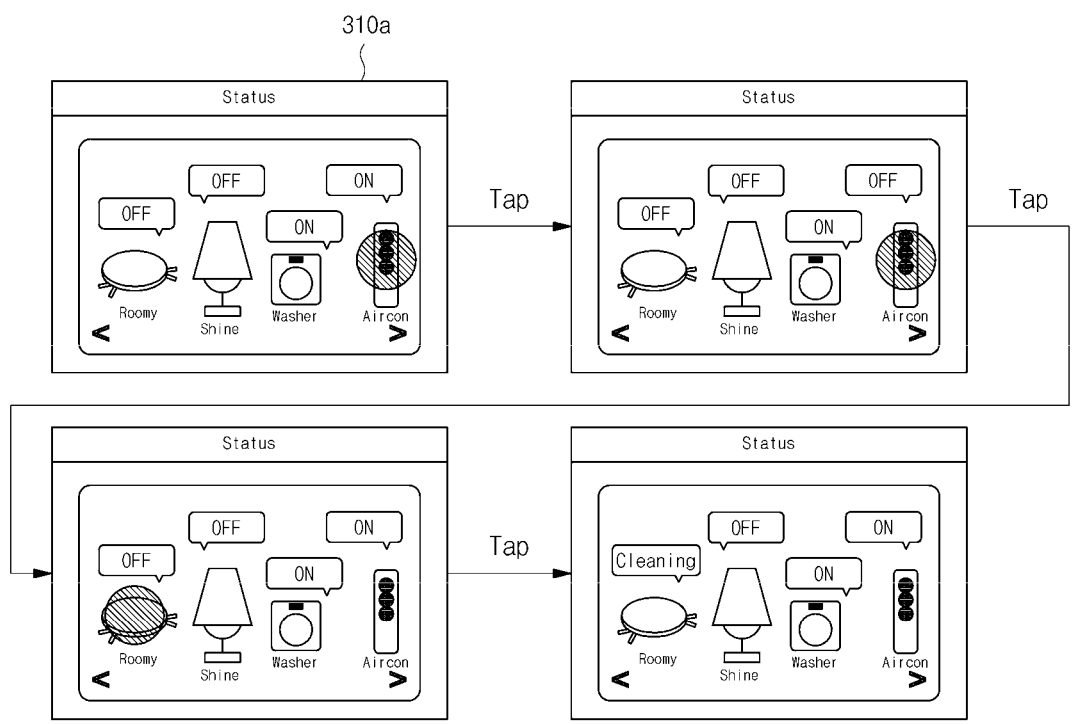
Figure 6:
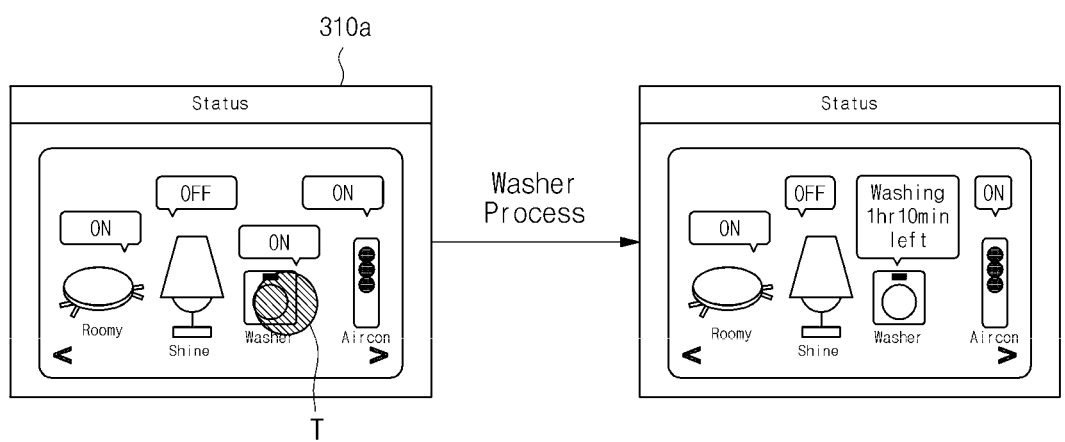

FIGS. 4 to 6 are exemplary diagrams showing an execution of an overview unit in a dashboard screen of a control device according to an embodiment. The overview unit 311 will be described in detail with reference to FIGS. 4 to 6.

As shown in FIG. 4, the overview unit 311 displays a list of pre-registered electric devices and displays icons A1 of the pre-registered electric devices.

In addition, the overview unit 311 further includes a movement button A2 for moving a screen on which the icons of the pre-registered electric devices are arranged.

That is, the movement button A2 is a button for moving the currently displayed icon to change a display position of the icon in order to display icons of the remaining electric devices that are hidden and not displayed on one screen in the overview unit.

In this case, the movement button A2 is in a hidden state when the number of icons of the pre-registered electric devices is less than a predetermined number of icons that can be displayed on one screen. The movement button A2 is in a displayed state when the number of icons of the pre-registered electric devices is greater than the predetermined number of icons that can be displayed on one screen.

The movement button A2 includes a first direction button < that instructs to move from a currently displayed screen to a screen extending in a first direction, and a second direction button > that instructs to move from the current displayed screen to a screen extending in a second direction. Here, the second direction is a direction opposite to the first direction.

When the first direction button < is selected, the overview unit 311 shifts icons of a predetermined number of electric devices in the current screen by one column in the second direction to rearrange the icons. When the second direction button > is selected, the overview unit 311 shifts icons of a predetermined number of electric devices in the current screen by one column in the first direction to rearrange the icons.

In this case, when the first direction button < is selected, the overview unit 311 rearranges an icon of a new electric device at the leftmost column of the screen and removes an icon of an electric device that has been positioned at the rightmost column. When the second direction button > is selected, the overview unit 311 rearranges an icon of a new electric device at the rightmost column and removes an icon of an electric device that has been positioned at the leftmost column.

In addition, when the first direction button < is selected, the overview unit 311 displays a screen positioned at the left side of the current screen and displays an icon of an electric device arranged on the left screen. When the second direction button > is selected, the overview unit 311 displays the screen positioned at the right side of the current screen and displays an icon of an electric device arranged on the right screen.

As shown in FIG. 4, when the second direction button > is touched while icons of a cleaner, a light fixture, a washing machine, and an air conditioner are arranged on the current screen of the overview unit 311, icons of an air conditioner2, a robot cleaner2, and a television positioned on the right screen of the current screen are displayed.

When the first direction button < is touched while the icons of the air conditioner2, the robot cleaner2, and the television are displayed, the overview unit 311 moves the currently displayed screen to the left screen and displays the icons of the cleaner, the light fixture, the washing machine, and the air conditioner positioned on the left screen again.

Although the movement button of the overview unit 311 is touched, the control unit 320 controls the user interface unit 310 such that screens of the widget units 312, 313, and 314 are maintained in the current state.

In addition, the overview unit 311 further includes a speech bubble A3 that informs about an on/off state or a progressive state, which indicates a current operation state, of a pre-registered electric device. The speech bubble A3 is positioned in the vicinity of the icon A1 such that the speech bubble A3 is easily recognized by the user.

The speech bubble A3 changes a notification indicating an operation state of an electric device on the basis of a command of the control unit 320.

That is, when any one of the icons displayed in the overview unit 311 is touched, the control unit 320 changes the operation state of the electric device corresponding to the touched icon and controls the user interface unit 310 such that the changed operation state is displayed in a speech bubble.

For example, when the icon of the air conditioner is touched while the air conditioner is in an on state, the control unit 320 controls the air conditioner to be powered off and controls the user interface unit 310 such that the off state of the air conditioner is displayed in the speech bubble. When the icon of the air conditioner is touched while the air conditioner is in an off state, the control unit 320 controls the air conditioner to be powered on and controls the user interface unit 310 such that the on state of the air conditioner is displayed in the speech bubble.

As shown in FIG. 5, on a condition that the icons of the robot cleaner, the light fixture, the washing machine, and the air conditioner are displayed, the overview unit 311 utilizes the speech bubble to inform that the operation of the air conditioner is powered off when the icon of the air conditioner that is powered on is touched, and utilizes the speech bubble to inform that the operation of the robot cleaner is cleaning when the robot cleaner that is power off is touched.

In addition, when the icon of a washing machine is touched while the washing machine is in an on state, the control unit 320 checks a work-in-progress state of the washing machine and controls the user interface unit 310 such that the checked work-in-progress state of the washing machine is displayed in the speech bubble.

As shown in FIG. 6, when an icon of the washing machine in an on state is touched while the icons of the robot cleaner, the light fixture, the washing machine, and the air conditioner are displayed, the overview unit 311 utilizes the speech bubble to inform that a progress state of the washing machine is "one hour and ten minutes have passed."

In addition, the control unit 320 may check at least one of an update state, an error state, and a reservation state of the pre-registered electric device, and may control the user interface unit such that the checked state information is displayed in the speech bubble.

That is, the speech bubble A3 informs about any one of the update information, the error information, and the reservation information of the electric device.

In addition, when an operation state of at least one electric device is changed in response to a touch input to a master key 312 of the widget unit and a chatting instruction input of a chatting unit 313, the control unit 320 controls the user interface unit 310 such that the changed operation state is displayed in a speech bubble.

The widget unit of the user interface unit 310 includes the master key 312 for operating a pre-registered electric device on the basis of a preset operation command, the chatting unit 313 for chatting with at least one of pre-registered electric devices, and a home view unit 314 that outputs a home interior image. This will be described with reference to FIGS. 7 and 8.

Figure 7:
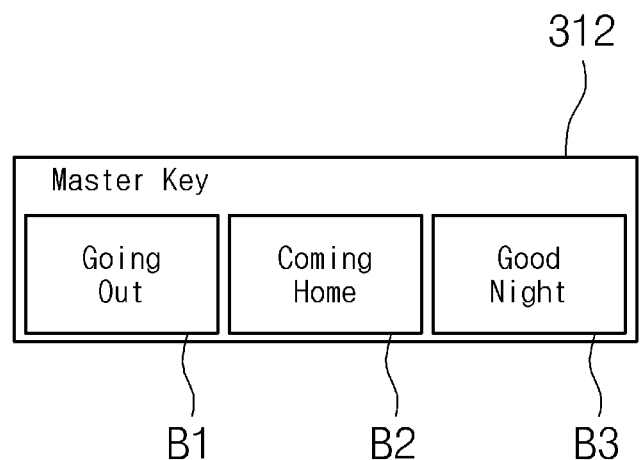
FIG. 7 is an exemplary diagram showing a master key in a dashboard screen of a control device according to an embodiment.

FIG. 7 is an exemplary diagram showing a master key in a dashboard screen of a control device according to an embodiment.

The master key 312 includes a button for integrally controlling operations of a plurality of electric devices. This button previously includes an operation command for each electric device.

The button of the master key 312 may be set on the basis of a user's schedule.

As shown in FIG. 7, the master key 312 includes a going-out button B1, a coming-home button B2, and a good-night button B3.

When the master key 312 of the user interface unit is touched, the control unit 320 checks the touched button to transmit a preset operation command for each electric device corresponding to the checked button to the pre-registered electric device, thus allowing the pre-registered electric device to operate on the basis of the preset operation command. In this case, the user interface unit 310 informs about the operation state of the pre-registered electric device through a speech bubble.

A button for integrally controlling the master key 312 may be additionally added. The addition may be performed through a "master key setting button" of the second plug-in screen.

In addition, the "master key setting button" may be arranged in the master key.

In addition, an operation command for an electric device for each button of the master key 312 may be changed. This change may also be performed through the "master key setting button" of the second plug-in screen.

In addition, the button in which the master key 312 is set may be deleted. This deletion may also be performed through the "master key setting button" of the second plug-in screen.

Figure 8:
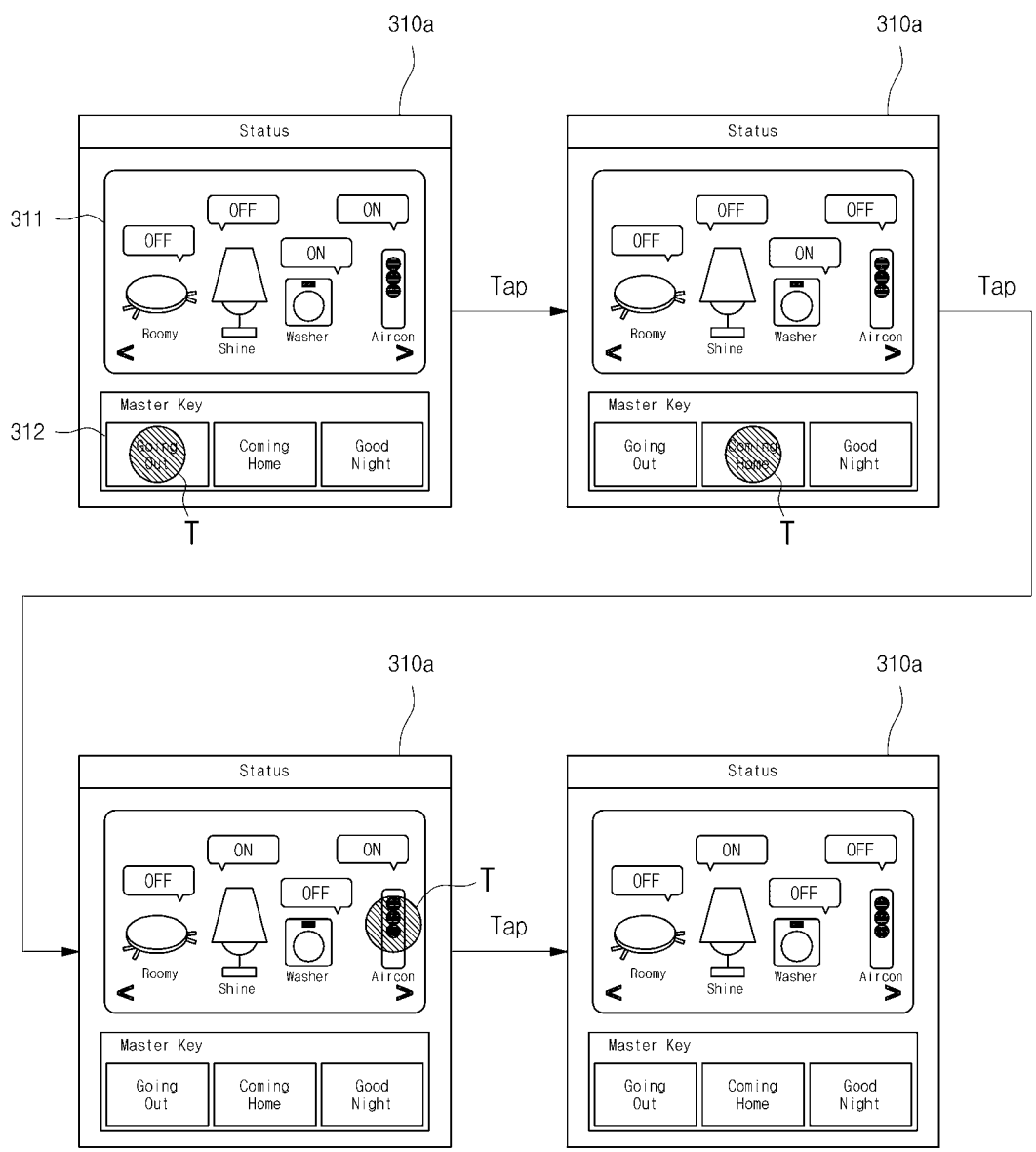
FIG. 8 is an exemplary diagram showing an execution of a master key in a dashboard screen of a control device according to an embodiment.

FIG. 8 is an exemplary diagram showing an execution of a master key in a dashboard screen of a control device according to an embodiment.

As shown in FIG. 8, the overview unit 311 displays icons of a robot cleaner, a light fixture, a washing machine, and an air conditioner and displays a speech bubble that informs about an operation state of each electric device in the vicinity of each of the icons.

It is assumed that the operation command for each electric device corresponding to the going-out button includes powering off the light fixture and powering off the air conditioner, and the operation command for each electric device corresponding to the coming-home button includes powering on the light fixture and powering on the air conditioner.

When the going-out button B1 of the master key 312 is touched (T) while an operation state of the robot cleaner is off, an operation state of the light fixture is off, an operation state of the washing machine is on, and an operation state of the air conditioner is on, the user interface unit 310 maintains the operation states of the robot cleaner and the light fixture in the off state, maintains the operation state of the washing machine in the on state in order to prevent the washing machine from stopping while working, and powers off the operation state of the air conditioner to inform about the operation state of each electric device through a speech bubble.

When the coming-home button B2 of the master key 312 is touched (T) while the operation state of the robot cleaner is off, the operation state of the light fixture is off, the operation state of the washing machine is off, and the operation state of the air conditioner is off, the user interface unit 310 maintains the operation states of the robot cleaner and the washing machine in the off state, powers on the lighting device and the air conditioner, and informs about the operation state of each electric device through a speech bubble. In this case, when a user touches (T) the icon of the air conditioner, the user interface unit 310 powers off the air conditioner and informs about the power-off through a speech bubble.

Figure 9:
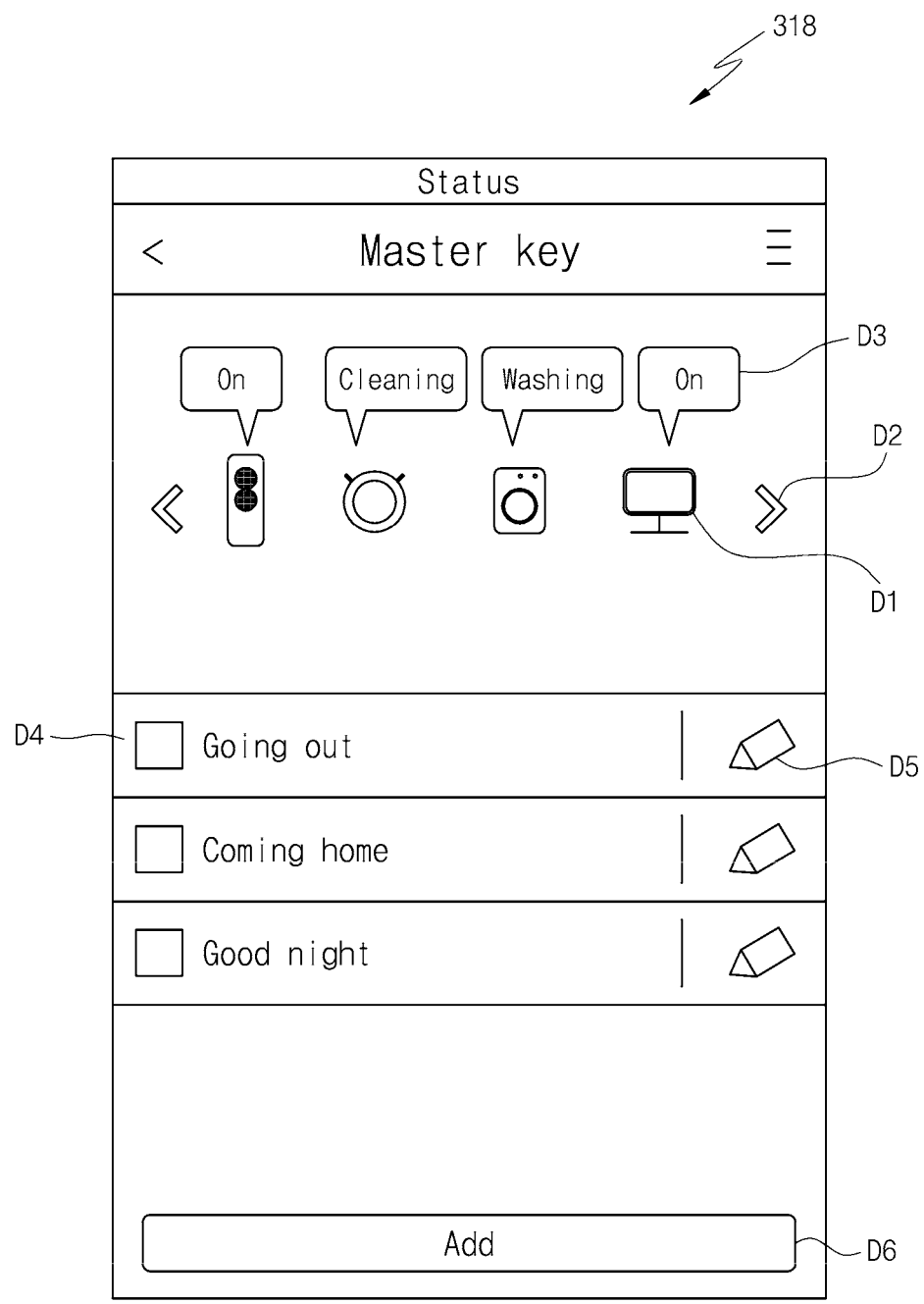
FIG. 9 is an exemplary diagram of a master key setting window (318) in a second plug-in screen of a control device according to an embodiment.
Figure 10:
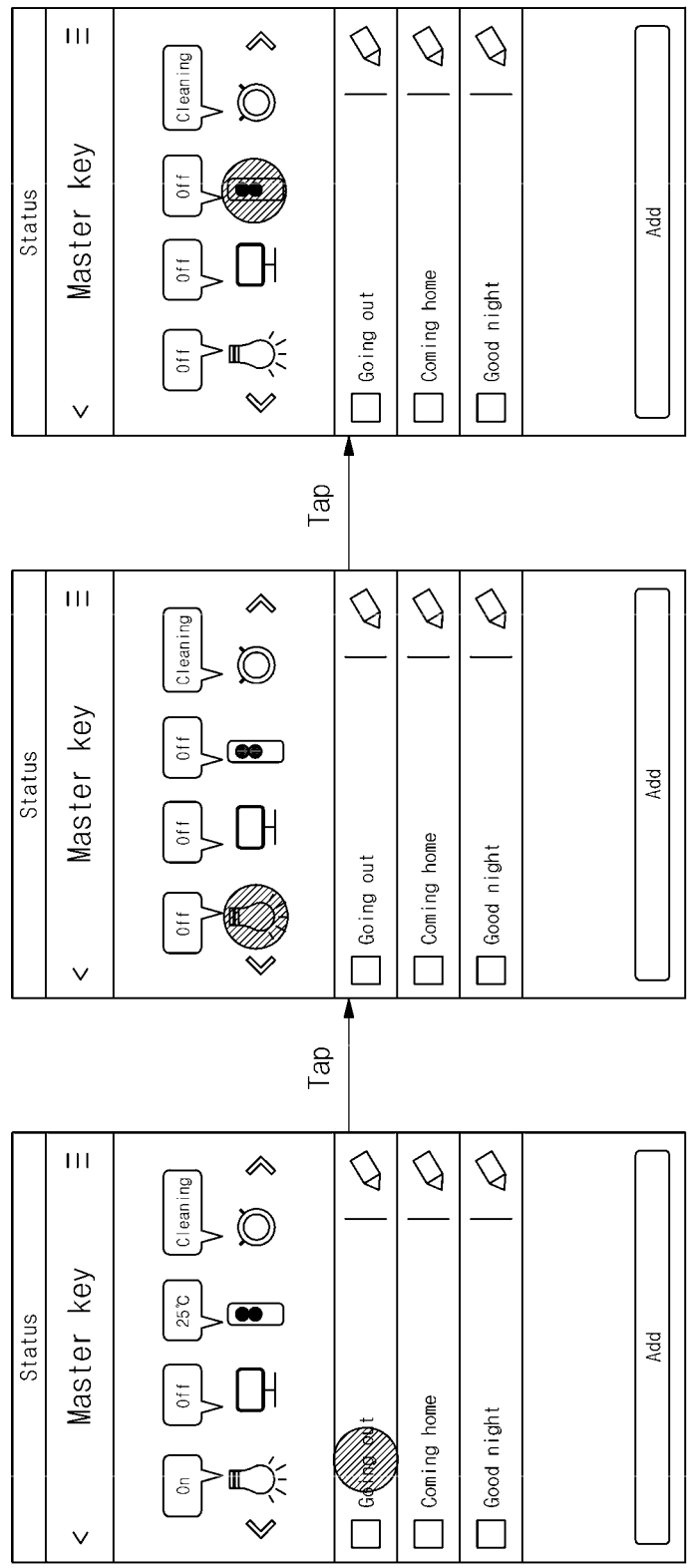
FIGS. 10 and 11 are exemplary diagrams showing the setting of a master key in a second plug-in screen of a control device according to an embodiment.
Figure 11:
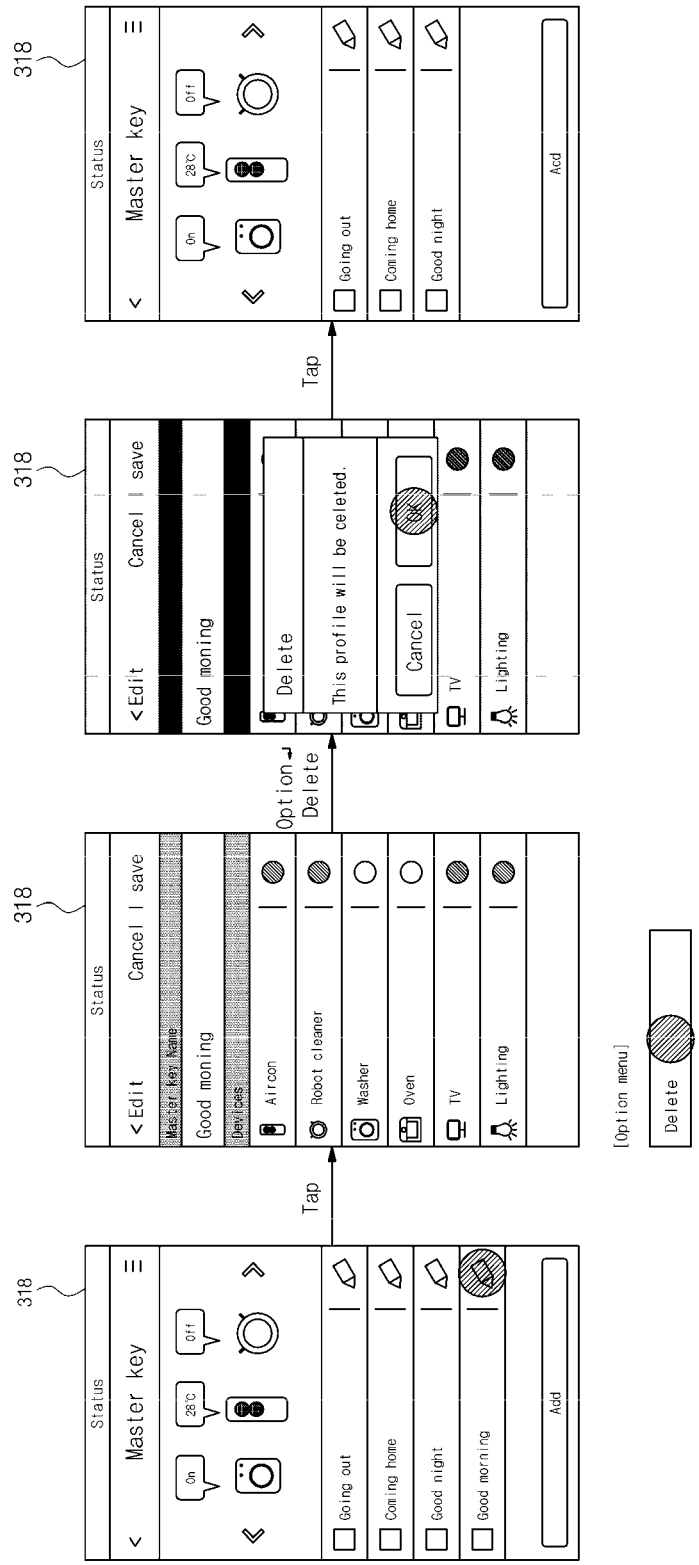
Figure 12A:
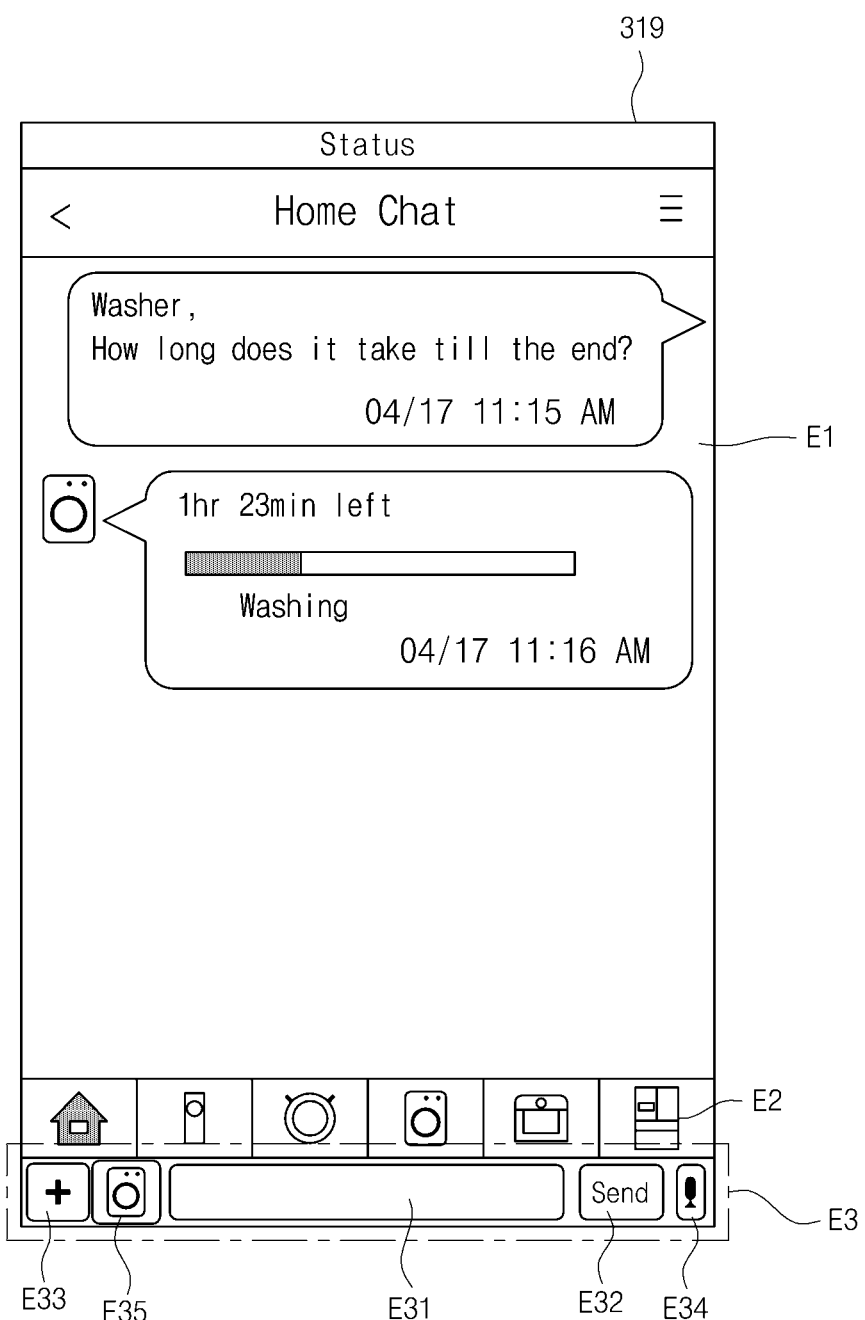
FIGS. 12A to 18 are exemplary diagrams showing the execution of a chatting unit in a dashboard screen of a control device according to an embodiment.
Figure 12B:
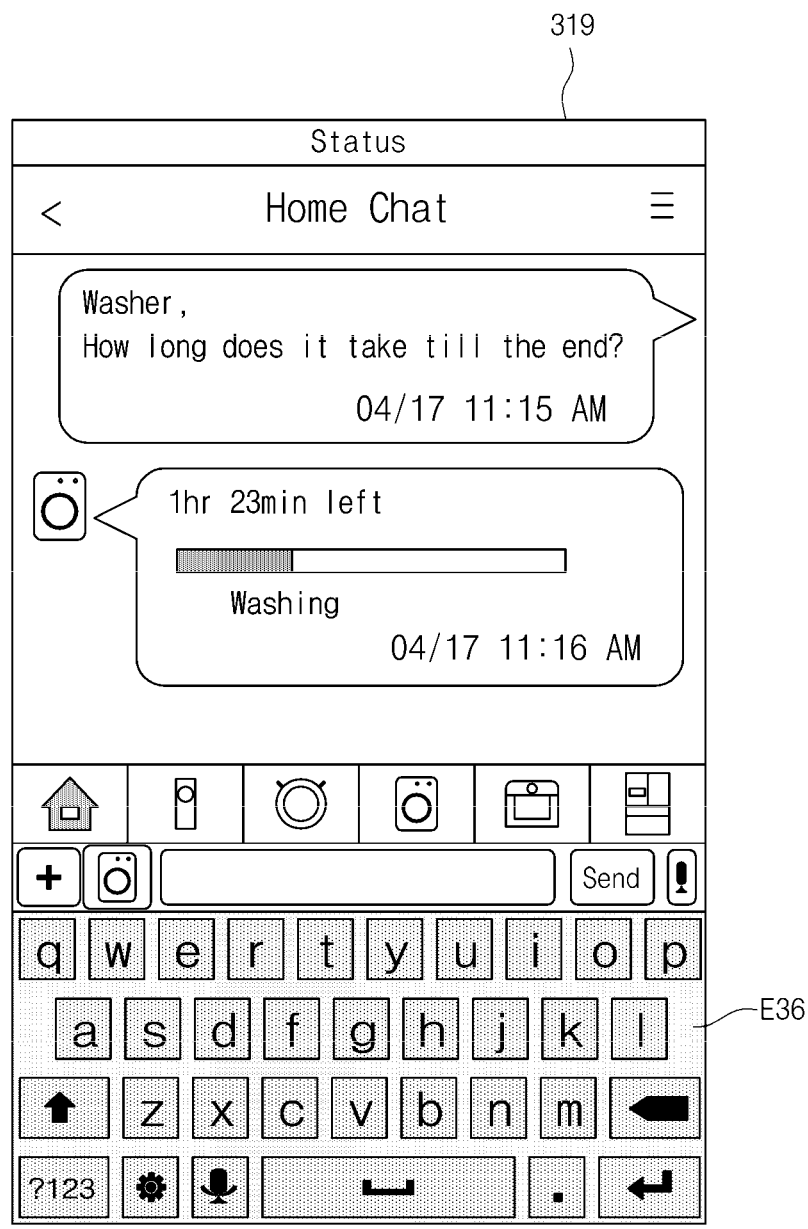
Figure 12C:
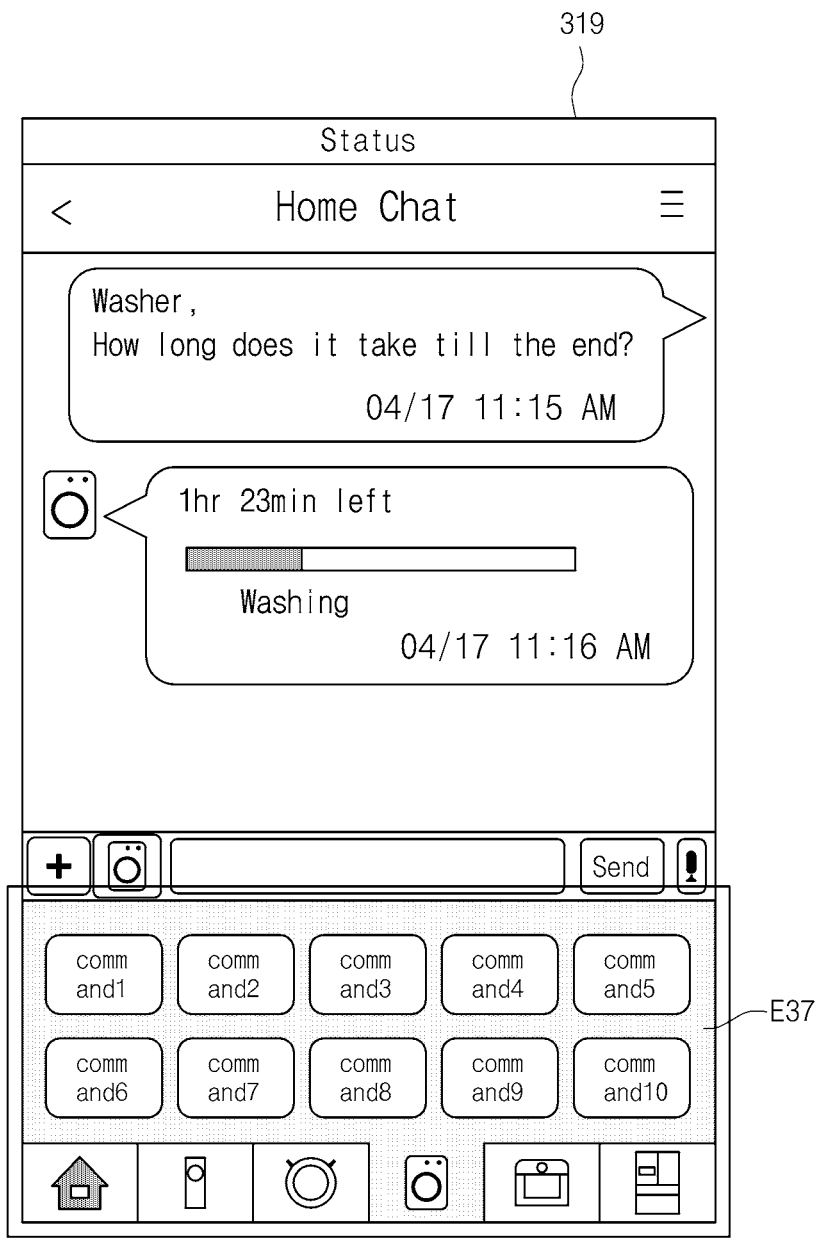
Figure 12D:
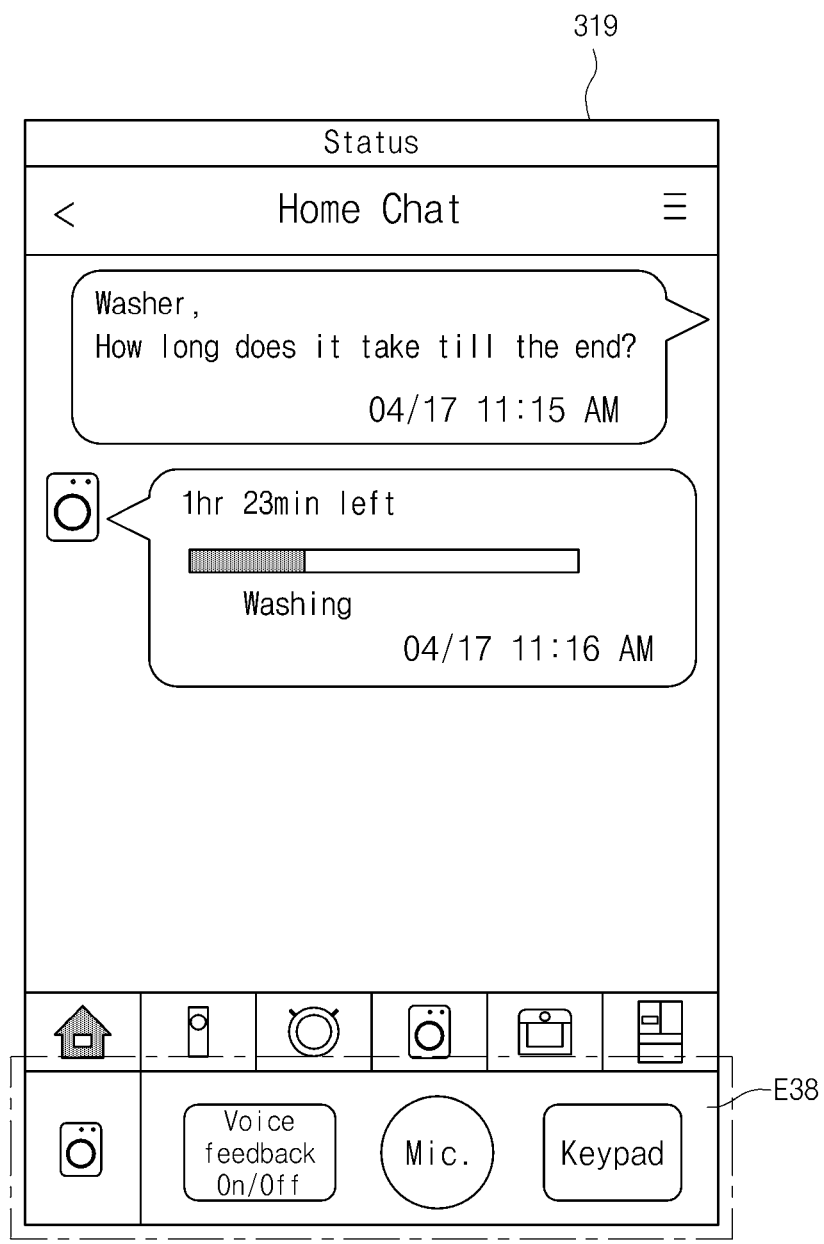

FIG. 9 is an exemplary diagram of a master key setting screen 318 in a second plug-in screen of a control device according to an embodiment, and FIGS. 10 and 11 are exemplary diagrams showing the setting of a master key in a second plug-in screen of a control device according to an embodiment.

When the master key setting button in the second plug-in screen is touched, the user interface unit 310 switches the dashboard screen into the master key setting screen 318.

As shown in FIG. 9, the master key setting screen 318 includes an icon D1 of an pre-registered electric device, a movement button D2 for moving a list of icons of electric devices, a speech bubble D3 that informs an operation command preset for each electric device, and a plurality of pre-registered buttons D4, an editing button D5 of each of the plurality of buttons, and an addition button D6 for adding an integral control button.

As shown in FIG. 10, on a condition that the light fixture is powered on, the television is powered off, the air conditioner is preset to a target indoor temperature of 25° C., and the cleaner is preset to be operating, when the going-out button is selected and the icon of the light fixture is touched, the master key setting screen 318 changes the operation command for the light fixture to an off state and then informs about the change through a speech bubble. When the icon of the air conditioner is touched, the master key setting screen 318 changes the operation command for the air conditioner to be an off state and then informs about the change through a speech bubble.

Thus, the preset command for each electric device corresponding to the going-out button of the master key includes powering off the light fixture, powering off the television, powering off the air conditioner, and operating the cleaner.

As shown in FIG. 11, on a condition that an going-out button, a coming-home button, a good-night button, and a good-morning button are set as integral control buttons, when an editing button of the good-morning button is touched, the master key setting screen 318 displays preset operation command information for each electric device corresponding to the good-morning button. In this case, when a deletion button of an option menu is touched, the master key setting screen 318 displays a window that informs that all information associated with the good-morning button is deleted. When an "OK" button is touched, the master key setting screen 318 displays a plurality of buttons from which the good-morning button has been removed.

FIGS. 12A to 12D are an exemplary diagram of a chatting screen when a chatting unit in a dashboard screen of a control device is executed according to an embodiment and exemplary diagrams illustrating the change in a chatting screen corresponding to a conversation input method.

When a chatting unit 313 is touched, the user interface unit 310 switches a dashboard screen to a chatting screen 319. This is the same as shown in portion (a) of FIG. 12.

As shown in portion (a) of FIG. 12, the chatting screen 319 includes a conversation display window E1 for displaying a conversation with at least one electric device, an icon selection window E2 for selecting an icon for at least one electric device or an icon for all electric devices, and a conversation input window E3 for selecting an input method of a conversation with at least one of pre-registered electric devices and inputting the conversation.

Here, the conversation input window E3 includes a text window E31 for selecting a message input method, a send button E32 for instructing to send a text sentence, a list button E33 for instructing to display a list of shortcut buttons implying chatting instructions, a microphone button E34 for instructing to input voice, and a target window E35 for displaying an icon of an electric device with which the user chats.

When a touch is input, the text window E31 displays a QWER type keypad E36.

In addition, the keypad E36 includes a button for switching to Korean characters or numbers. When the switching button is touched, Korean characters or numbers may be displayed.

Portions (b), (c), and (d) of FIG. 12 are exemplary diagrams illustrating changes in the chatting screen corresponding to a conversation input method. They will be described with reference to FIGS. 13 to 18.

As shown in portion (b) of FIG. 12, when the text window is touched, the keypad E36 is displayed, and thus a process for preparing a user to chat is performed.

Figure 13:
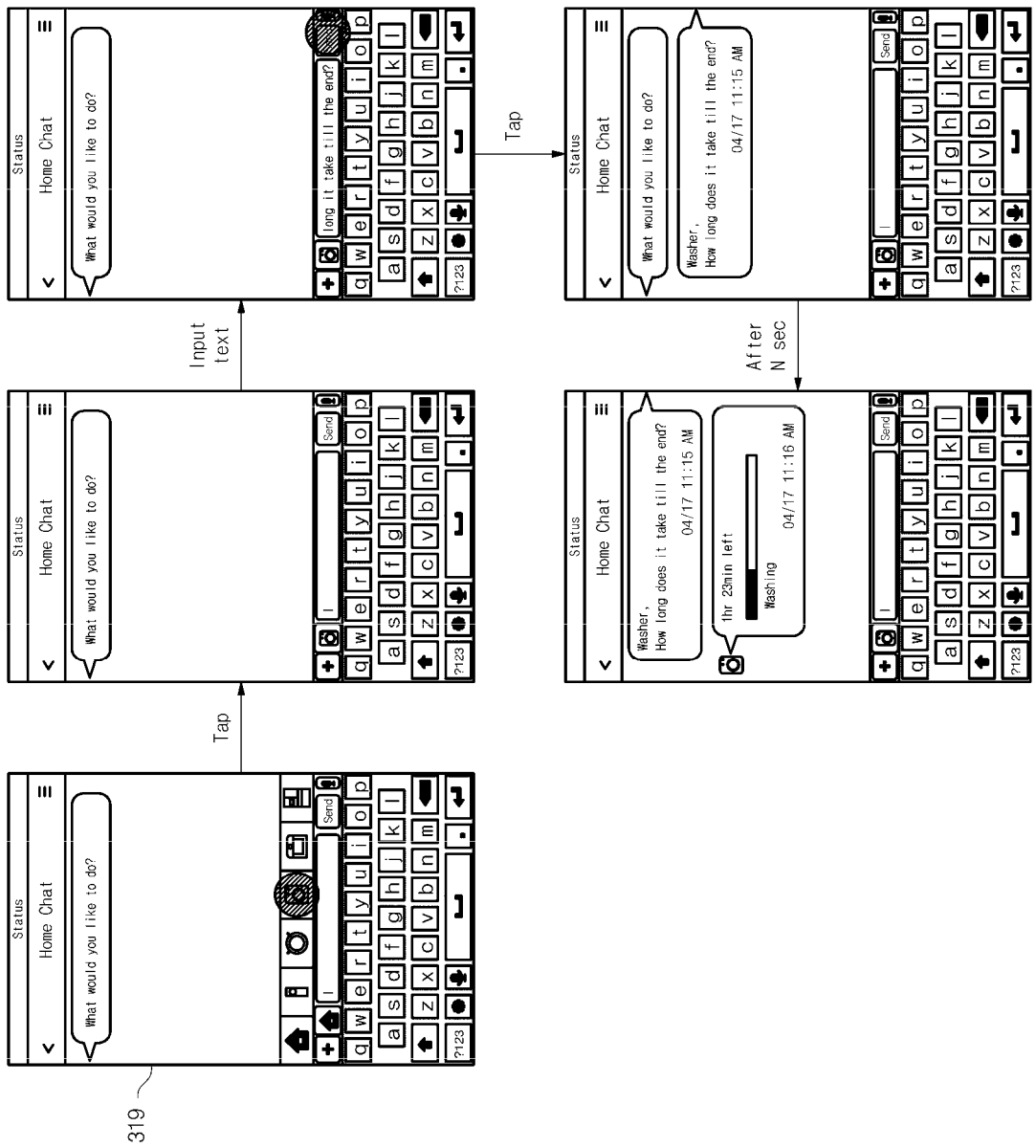

As shown in FIG. 13, when the icon of the washing machine is touched, the chatting screen 319 displays the icon of the washing machine on the target window. When the text window is touched, the chatting screen 319 displays the keypad E36, and thus performs a preparation process to allow the user to chat.

When a message for inquiring about a progress state of the washing machine is input, and then the send button is touched, the chatting screen 319 displays the input message on a representative display window, receives information regarding a current progress state from the washing machine, and displays the received progress state on a progress bar, etc.

In addition, the chatting screen displays a time at which the chatting word is input to the conversation display window together.

Figure 14:
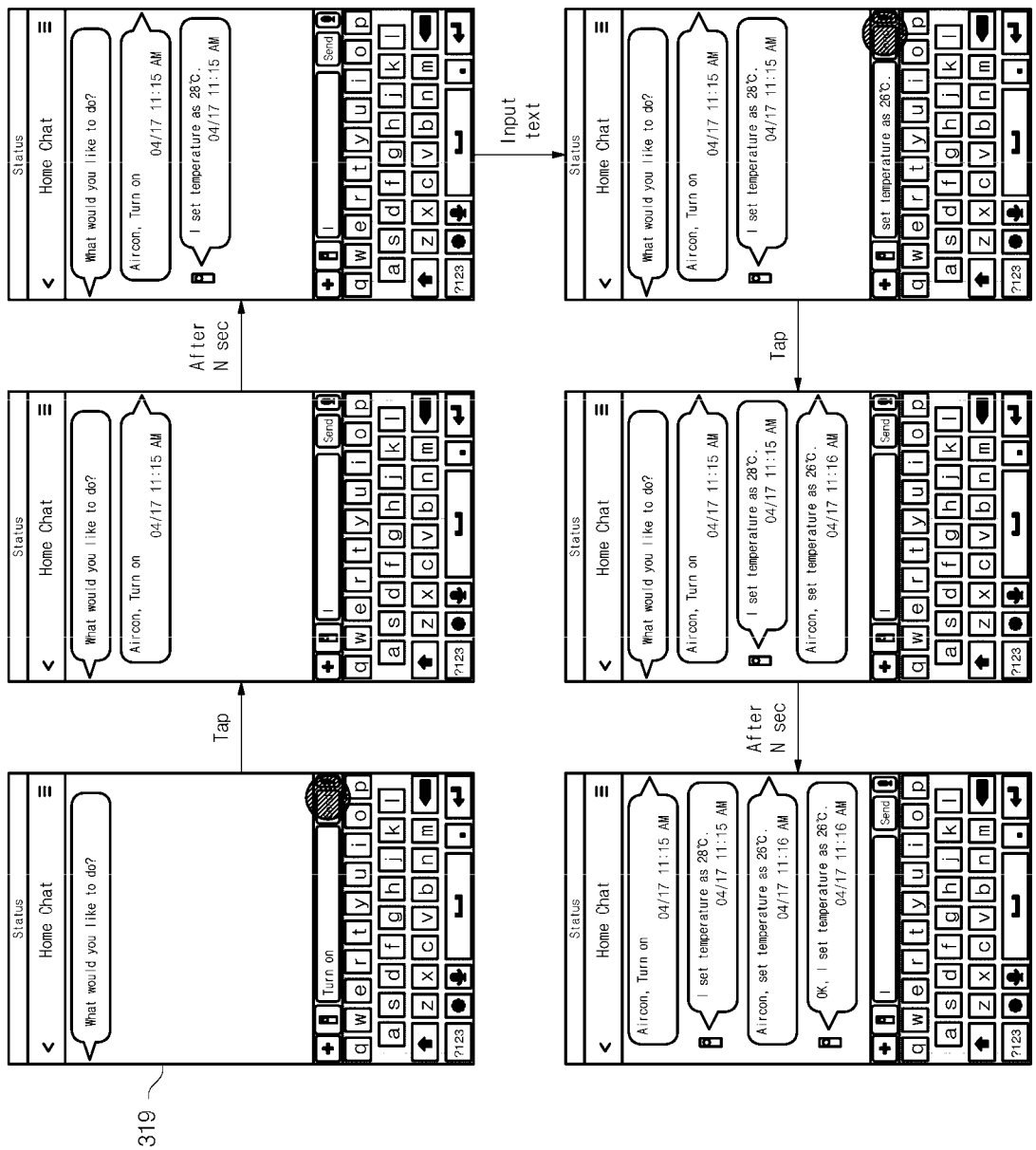

In addition, as shown in FIG. 14, when the icon of the air conditioner is touched, the chatting screen 319 displays the icon of the air conditioner on the target window. When the text window is touched, the chatting screen 319 displays the keypad E36, and thus performs a preparation process to allow the user to chat.

When an operation command is input through a message, and then the send button is touched, the chatting screen 319 displays the input on-operation command on the conversation display window and displays a current indoor temperature provided by the air conditioner. When a target indoor temperature is input through a message, and then the send button is touched, the chatting screen 319 displays the input target indoor temperature on the conversation display window, receives a response that the command will be performed from the air conditioner, and displays the received response on the conversation display window.

Figure 15:
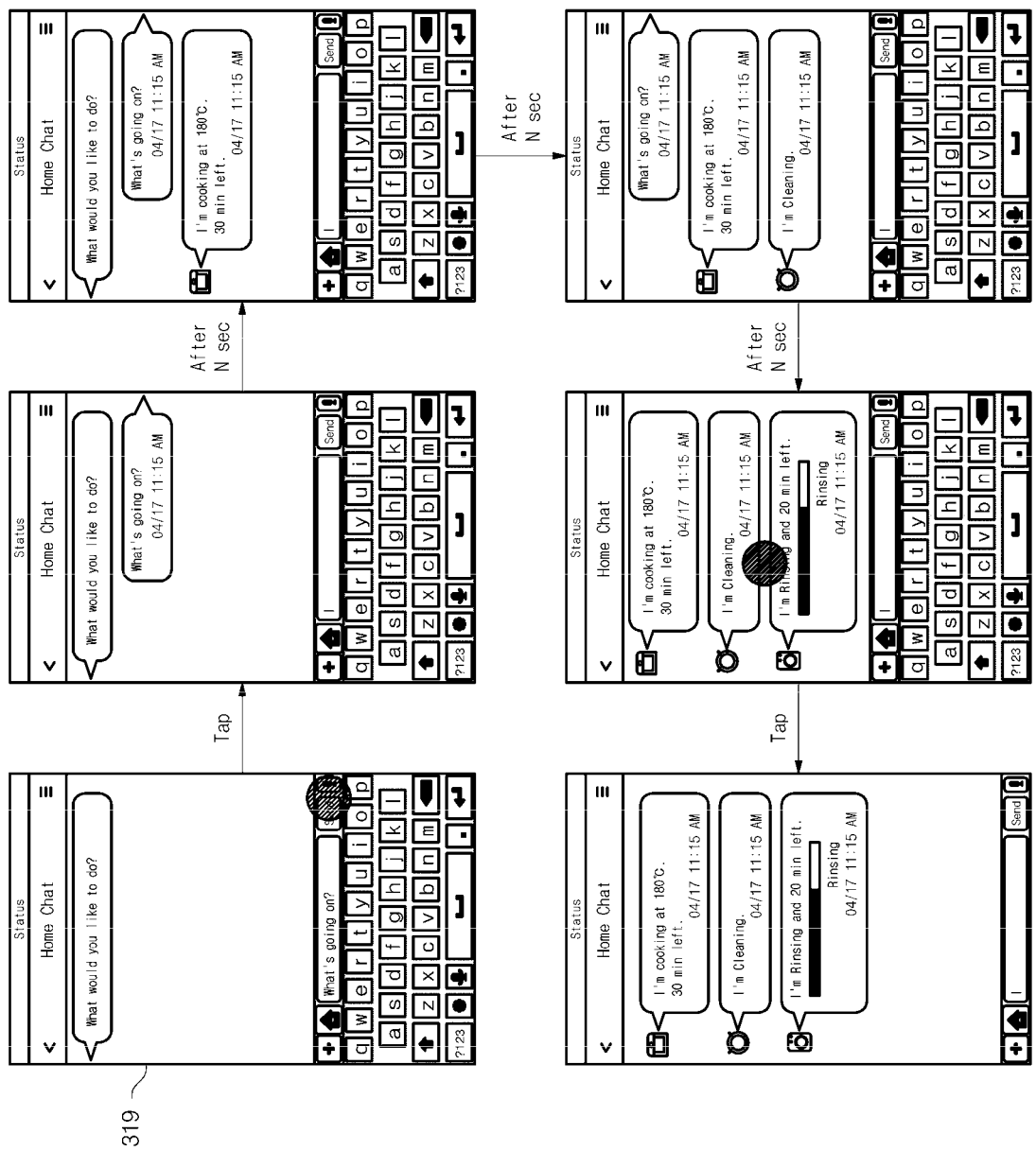

As shown in FIG. 15, when an icon for selecting all devices is selected, the chatting screen 319 displays the icon for selecting all devices on the target window. When the text window is touched, the chatting screen 319 displays the keypad E36 and thus performs a preparation process to allow the user to chat.

When a chatting word for monitoring all devices is input through a keypad, the chatting screen 319 displays the input chatting word on the conversation display window. When monitoring information is received from a pre-registered electric device, the chatting screen 319 displays the received monitoring information for each electric device on the conversation display window.

When the conversation display window is touched while the monitoring information for each electric device is displayed, the chatting screen 319 hides the keypad.

Figure 16:
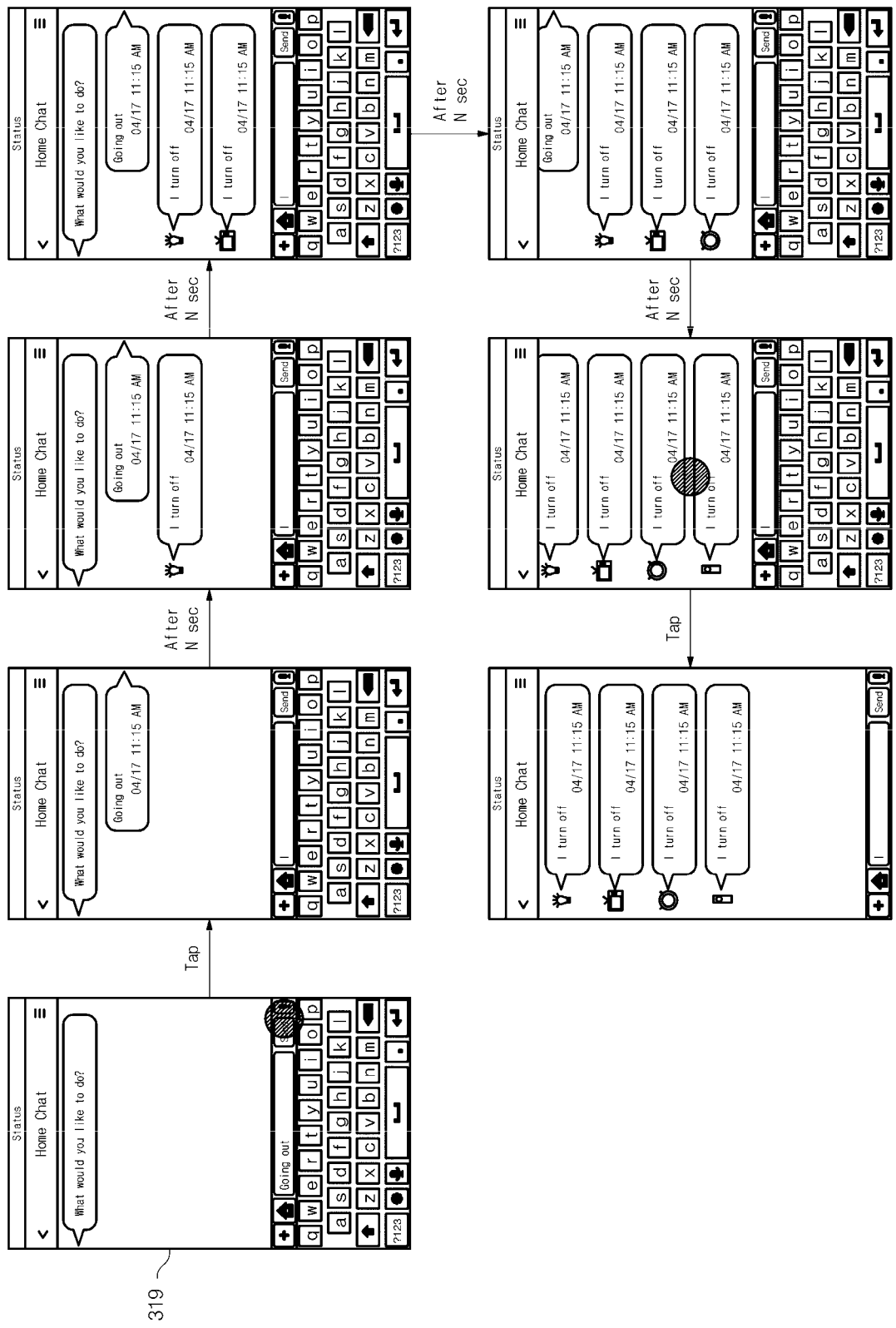

As shown in FIG. 16, when an icon for selecting all devices is selected, the chatting screen 319 displays the icon for selecting all devices on the target window. When the text window is touched, the chatting screen 319 displays the keypad E36 and thus performs a preparation process to allow the user to chat.

When a chatting word for informing all devices of the going-out is input through the keypad, the chatting screen 319 displays the input chatting word on the conversation display window. When operation state information corresponding to the going-out is received from a pre-registered electric device, the chatting screen 319 displays the received operation state information for each electric device on the conversation display window.

When the conversation display window is touched while the operation state information for each electric device is displayed, the chatting screen 319 hides the keypad.

When the icon of the air conditioner is touched, the chatting screen 319 displays the icon of the air conditioner on the target window. When the text window is touched, the chatting screen 319 displays the keypad E36 and thus performs a preparation process to allow the user to chat.

When an operation command is input through a message, and then the send button is touched, the chatting screen 319 displays the input on-operation command on the conversation display window and displays a current indoor temperature provided by the air conditioner. When a target indoor temperature is input through a message, and then the send button is touched, the chatting screen 319 displays the input target indoor temperature on the conversation display window, receives a response that the command will be performed from the air conditioner, and displays the received response on the conversation display window.

As shown in portion (c) of FIG. 12, when the list button E33 is touched, the chatting screen 319 displays a plurality of shortcut buttons E37 on which respective chatting instructions are displayed and thus performs a preparation process to allow the user to chat.

Figure 17:
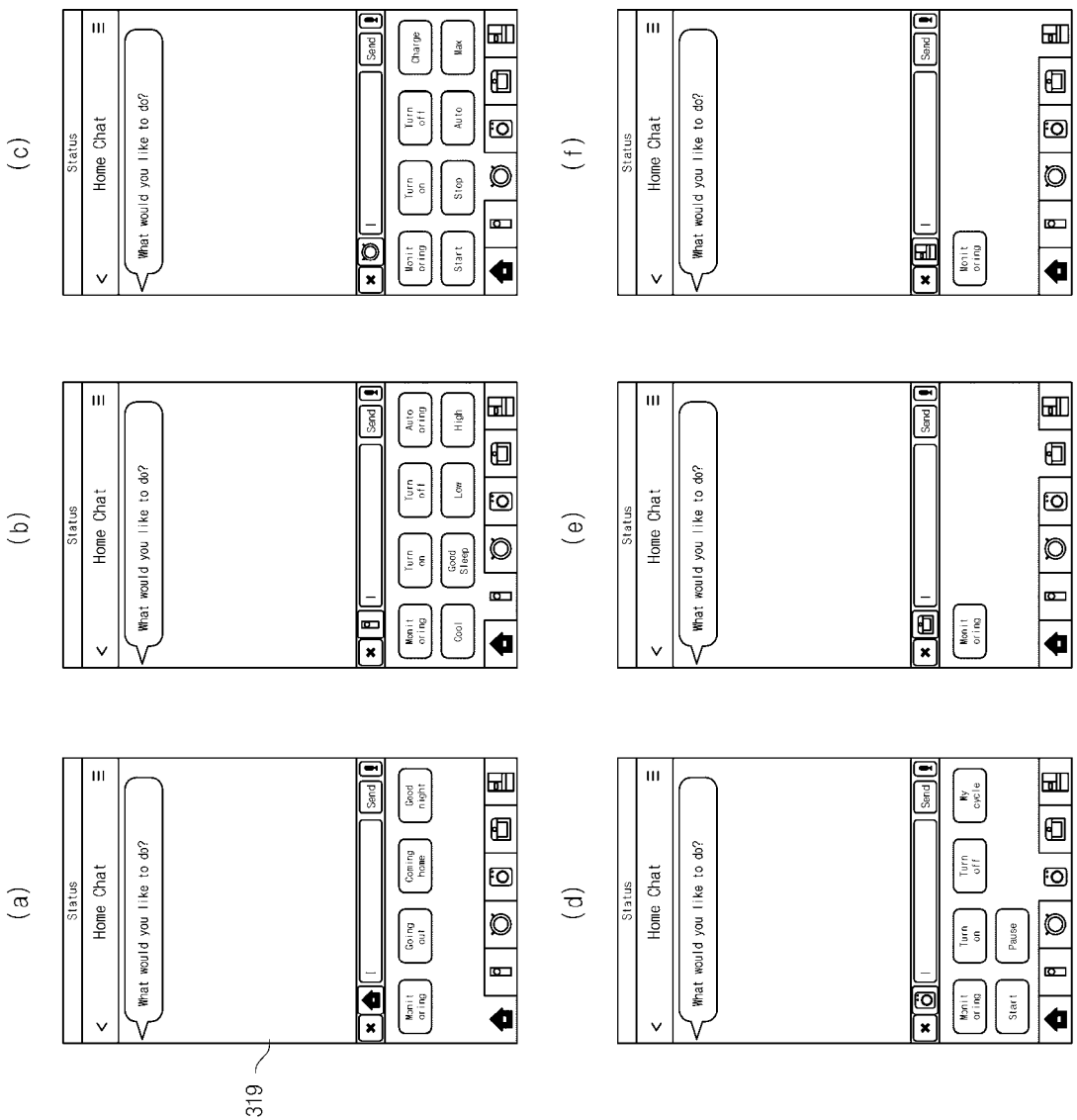

FIG. 17 shows an example of a shortcut button for each pre-registered electric device.

Portion (a) of FIG. 17 is an exemplary diagram of a shortcut button list corresponding to the icon for selecting all devices. When the icon for selecting all devices is selected, a plurality of shortcut buttons have respective operation commands for integrally controlling all of the pre-registered electric devices. In addition, the plurality of shortcut buttons for sending the control command to all devices correspond to buttons of the master key.

Portion (b) of FIG. 17 is an exemplary diagram of a shortcut button list corresponding to the operation control of the air conditioner, portion (c) of FIG. 17 is an exemplary diagram of a shortcut button list corresponding to the operation control of the robot cleaner, portion (d) of FIG. 17 is an exemplary diagram of a shortcut button list corresponding to the operation control of the washing machine, portion (e) of FIG. 17 is an exemplary diagram of a shortcut button list corresponding to the operation control of the cooking appliance, and portion (0 of FIG. 17 is an exemplary diagram of a shortcut button list corresponding to the operation control of the refrigerator.

Figure 18:
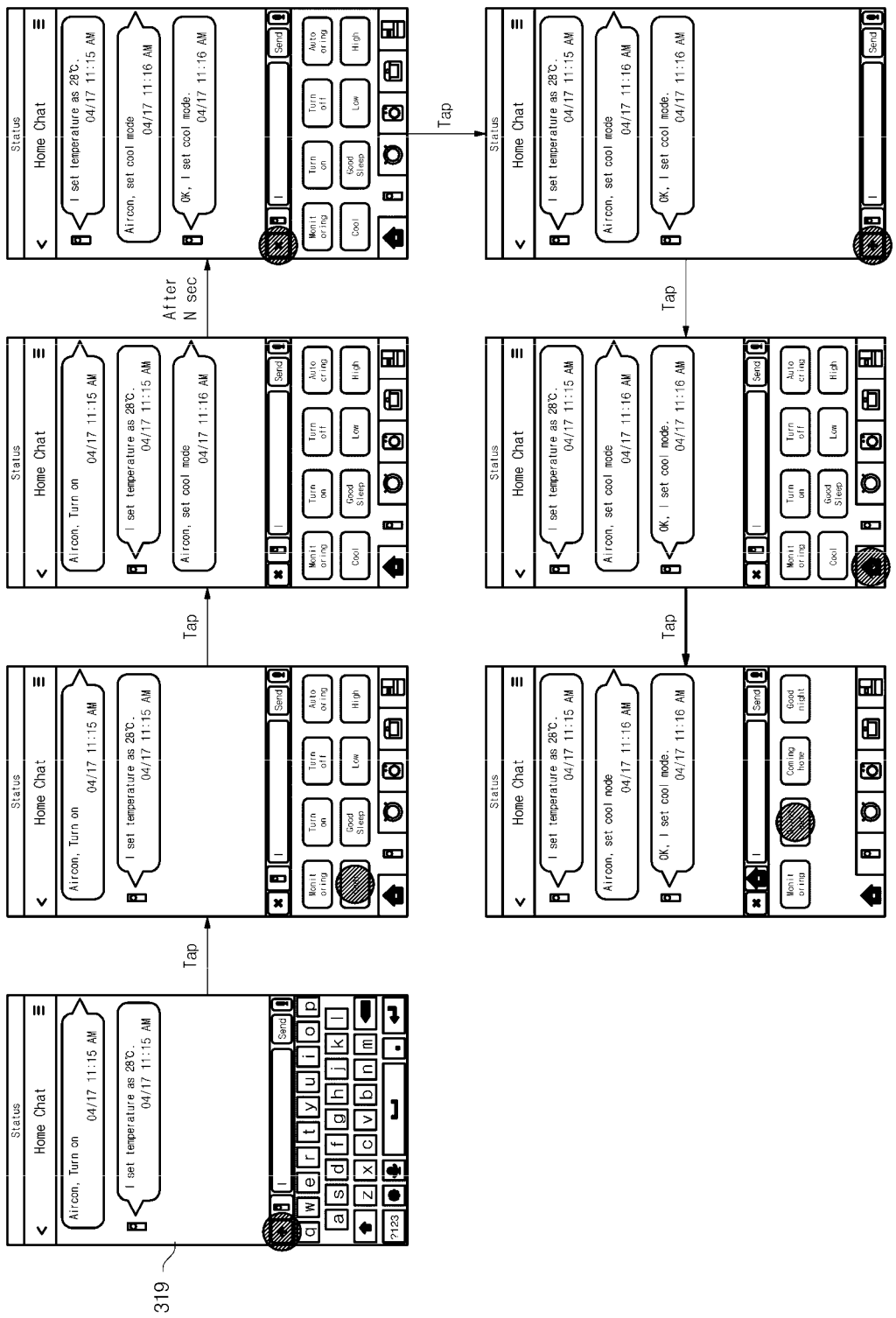

As shown in FIG. 18, when the icon of the air conditioner is touched, the chatting screen 319 displays the icon of the air conditioner on the target window. When information regarding a current indoor temperature is received from the air conditioner, the chatting screen 319 displays the received current indoor temperature on the conversation display window.

When the list button is touched, the chatting screen 319 displays the plurality of shortcut buttons E37 on which the chatting instructions for operation control associated with the air conditioner are displayed.

When a shortcut button for instructing air-conditioning is touched among the plurality of shortcut buttons, the chatting screen 319 displays a conversation corresponding to the touched shortcut button on the conversation display window, receives an operation state from the air conditioner, and displays a conversation of "an air conditioning operation will be performed." When the list button is touched after a predetermined period of time has passed, the chatting screen 319 hides the list button. Subsequently, when the list button in the conversation input window is touched, the chatting screen 319 displays the icon selection window and the shortcut button list.

When the icon for selecting all devices is touched while the icon selection window and the shortcut button list are displayed, the chatting screen 319 displays the icon for selecting all devices on the target window and displays a list of shortcut buttons corresponding to the icon for selecting all devices.

Subsequently, when the going-out button is touched among the plurality of shortcut buttons, the chatting screen 319 displays a conversation informing that the going-out button has been touched on the conversation display window and sends a preset operation command for each electric device corresponding to the going-out button to each electric device.

In addition, the chatting screen displays a time at which the chatting word is input to the conversation display window together.

As shown in portion (d) of FIG. 12, when the microphone button E34 is touched, the chatting screen 319 displays a voice input window E38 for receiving a voice command and thus performs a preparation process to allow the user to chat.

As shown in portion (d) of FIG. 12, when the icon of the washing machine is touched, the chatting screen 319 displays the icon of the washing machine on the target window. When the microphone button E34 is touched, the chatting screen 319 displays a voice input window E38 for inputting a voice command and thus performs a preparation process to allow the user to chat.

In addition, the voice input window includes a button for setting a voice command feedback, a button for inputting a voice, and a keypad switching button for performing switching to the keypad.

When a word is uttered while the button for inputting a voice is touched, the chatting screen 319 collects and then recognizes the voice through a microphone, and displays the recognized voice on the conversation display window. When a query corresponding to the recognized voice is about a progress state of the washing machine, the chatting screen 319 receives information regarding a current progress state from the washing machine and displays the received progress state using a progress bar, etc.

In addition, the chatting screen displays a time at which the chatting word is input to the conversation display window together.

The home view unit 314 may output interior images of the user's home at predetermined intervals. When a touch command is input, the home view unit 314 may expand a home view image and output the expanded image to the dashboard screen.

In addition, the home view unit 314 may output a previous image in response to the user's command.

Figure 19:
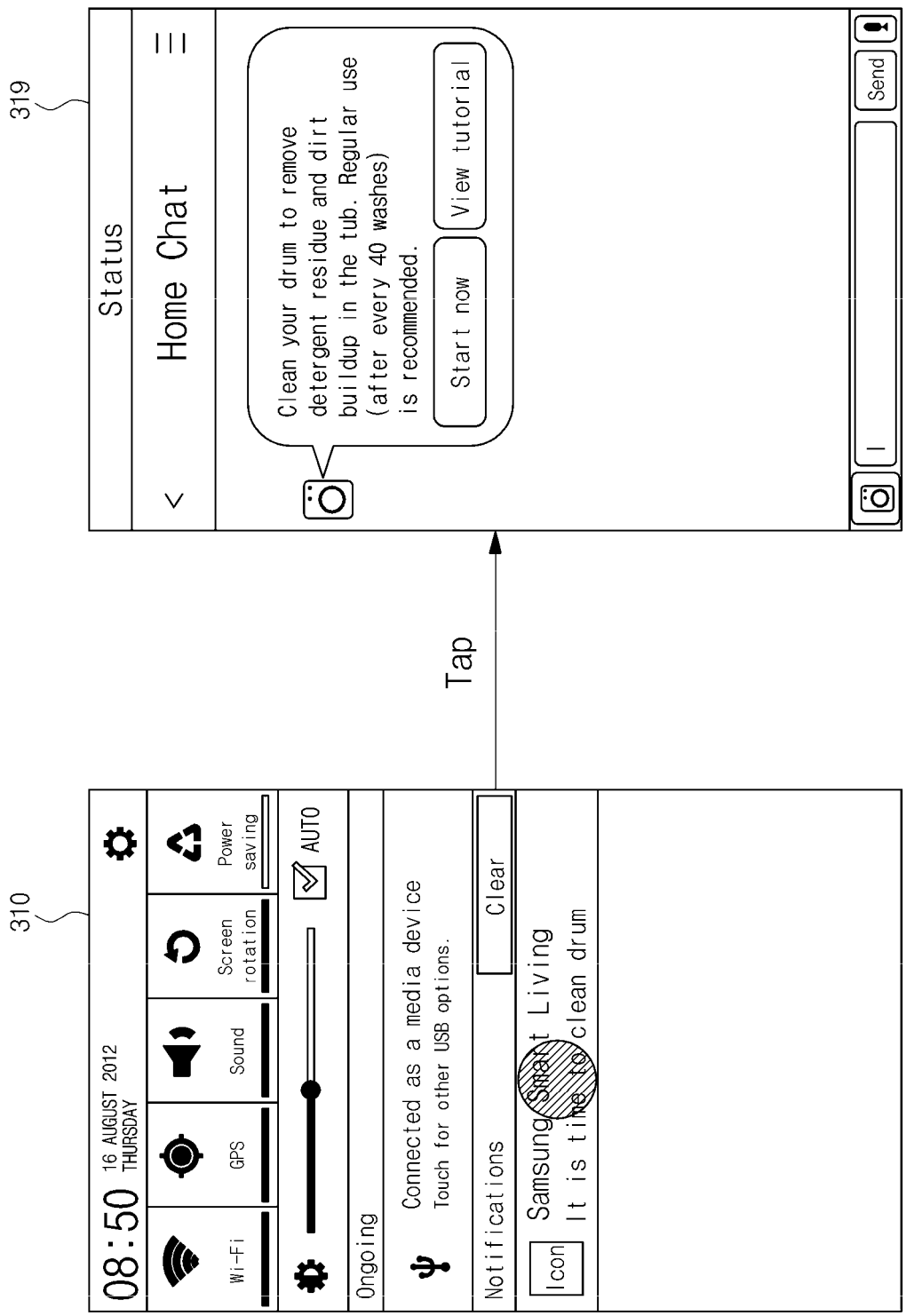
FIGS. 19 and 20 are exemplary diagrams showing a quick panel window displayed on a home screen of a control device according to an embodiment.
Figure 20:
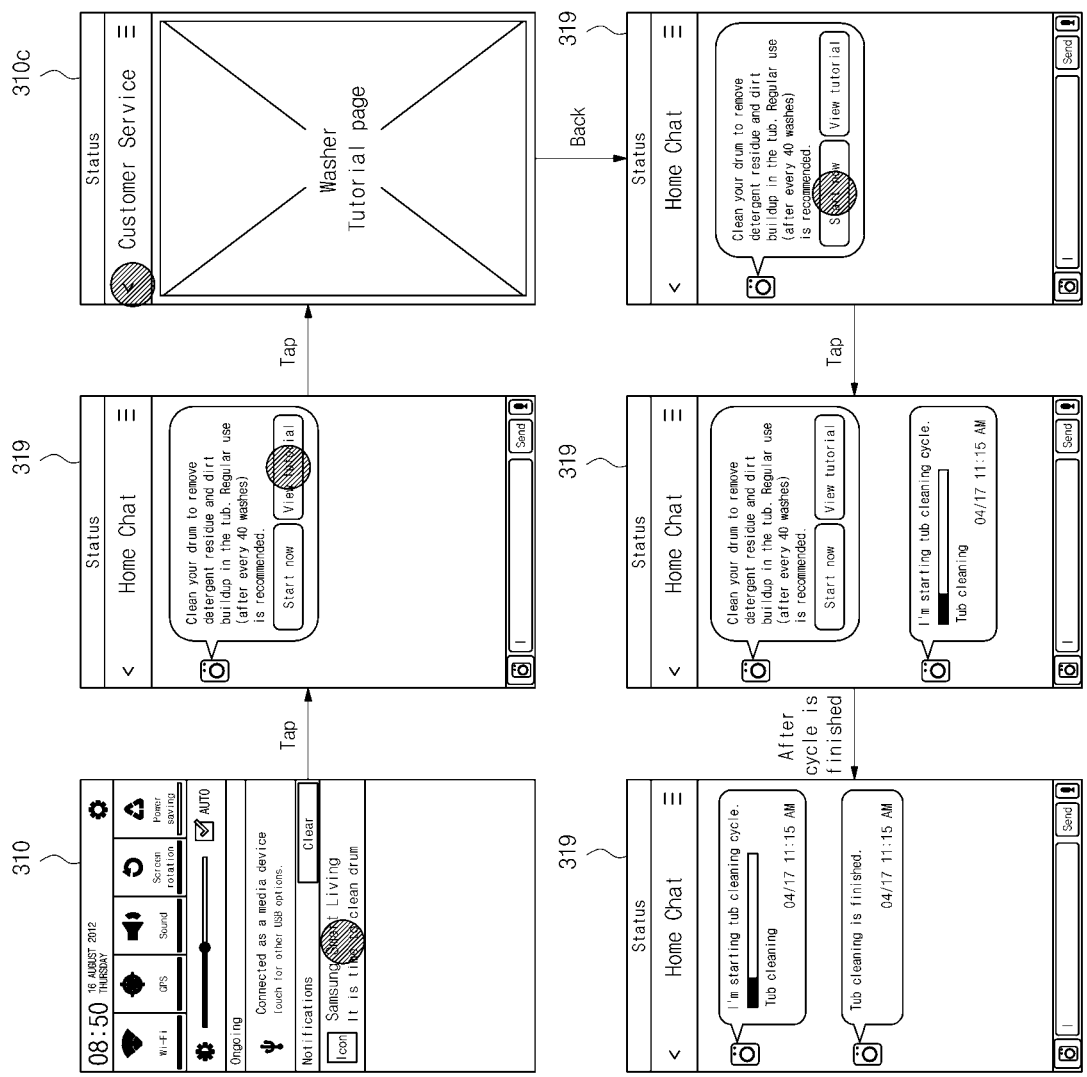

FIGS. 19 and 20 are exemplary diagrams showing a quick panel window displayed on a home screen of a control device according to an embodiment.

As shown in FIG. 19, the control device determines whether an operation state of at least one electric device has been changed while an app is not executed. When it is determined that the operation state of the at least one of electric device has been changed, the control device displays notification information corresponding to the change in the operation state on a home screen of the user interface unit 310 through a quick panel window.

In addition, while the app is not executed, the control device displays notification information about an update, error, and management period of the at least one electric device on the home screen through the quick panel window.

When the notification information in the quick panel window is touched, the user interface unit 310 displays in detail information about a corresponding electric device.

As shown in FIG. 20, the user interface unit may display a tutorial about the corresponding electric device and perform association with an operation for managing the washing machine.

For example, when a button for instructing to clean a laundry drum is touched while a message such as "clean laundry drum of washing machine" is displayed, the user interface unit sends a laundry drum cleaning command to the washing machine and displays a cleaning-in-progress state of the laundry drum on the user interface unit.

Figure 21:
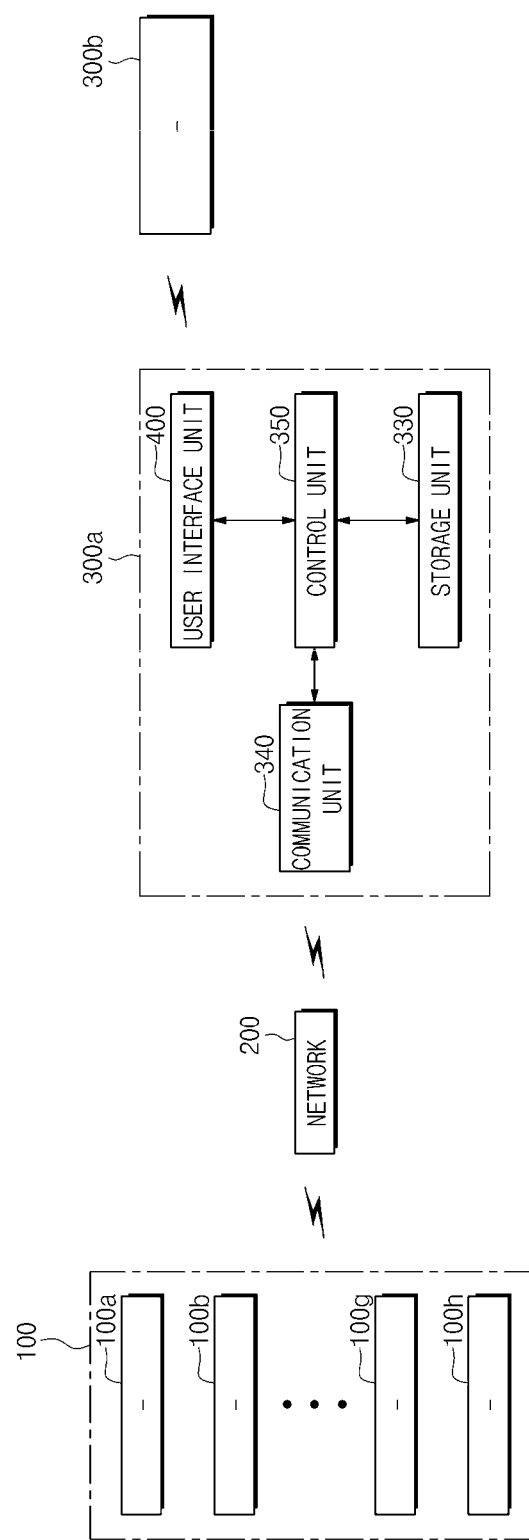
FIG. 21 is a control block diagram showing a control device according to another embodiment.

FIG. 21 is a control block diagram showing a control device according to another embodiment.

As shown in FIG. 21, a control device 300a communicates with another control device 300b, and sends a control command to at least one of a plurality of electric devices on the basis of an operation command or information associated with the operation command sent by the other control device 300b.

Here, the other control device 300b is an information technology (IT) device that may be installed in a human body, and may be a wearable device provided as, e.g., a wrist watch, a belt, or glasses. The wearable device is capable of input/output and communication.

For example, the control device 300a may be a smartphone that communicates with a wrist-watch-type device, and the other control device 300b may be a wrist-watch-type device.

Alternatively, the control device 300a may be a TV associated with a TV remote controller, and the other control device 300b may be a separate TV remote controller.

That is, the other control device 300b receives an operation command for at least one of a plurality of electric devices from a user and transmits the received operation command to a control device 300a which is pre-registered. An app for controlling an electric device in the home may be installed in the other control device 300b.

Although not shown, the other control device 300b may include an input unit.

Examples of an input through the input unit of the other control device may include a touch input, an electronic pen, a pointing device (e.g., a mouse, etc.), a keyboard, a voice, and an operation.

In addition, the other control device 300b may include an output unit.

Examples of an output through the output unit of the other control device may include an output through a display unit such as a touch panel, etc., a voice output, a vibration output, and a light output.

The control device 300a and the other control device 300b may be connected by wire or wirelessly. The wired connection scheme may include Mobile High-Definition Link (MHL) and Universal Serial Bus (USB), and the wireless connection scheme may include Bluetooth, WiFi, Zigbee, IrDA, and short-range communication.

Although not shown, a method of controlling an electric device using the control device 300a and the other control device 300b will be described, for example, as follows.

The input through the other control device 300b may be a voice input. When the other control device 300b has a touch panel, the input may be a touch input.

On a condition that a control command is input to the other control device 300b through the voice input, when the other control device 300b transfers voice information to the control device 300a, the control device 300a analyzes the voice, acquires a corresponding instruction, and performs a control operation corresponding to the instruction.

Alternatively, when the other control device 300*b* digitalizes or encodes voice information and transfers the digitalized or encoded voice information to the control device 300*a*, the control device 300*a* analyzes the digitalized or encoded information, acquires a corresponding instruction, and performs a control operation corresponding to the instruction.

Alternatively, when the other control device 300*b* analyzes voice information and transfers specific information indicating a result of the analysis to the control device 300*a*, the control device 300*a* acquires a command associated with the specific information and performs a control operation corresponding to the instruction.

Alternatively, when the other control device 300*b* analyzes voice information, acquires an instruction corresponding to the voice information, and transmits the acquired instruction to the control device 300*a*, the control device 300*a* performs a control operation corresponding to the instruction.

On a condition that a control command is input to the other control device 300*b* through the touch input, when the other control device 300*b* transfers information corresponding to a touched icon to the control device 300*a*, the control device 300*a* acquires an instruction corresponding to the information and performs a control operation corresponding to the instruction.

Alternatively, when the other control device 300*b* acquires the corresponding command through the information corresponding to the touched icon and transmits the acquired instruction to the control device 300*a*, the control device 300*a* performs a control operation corresponding to the instruction.

Here, the control command may be a command for controlling a plurality of electric devices.

When the command for controlling the plurality of electric devices is input to the other control device 300*b*, the other control device 300*b* determines whether the input command is the command for controlling the plurality of electric devices and transmits a result of the determination to the control device 300*a*.

The determination result may be transmitted simultaneously with, or separately from, the input command.

Alternatively, the other control device 300*b* determines whether the input command is the command for controlling the plurality of electric devices. When the input command is a command for controlling the plurality of electric devices, the other control device 300*b* may directly transmit a control command to electric devices to be controlled, instead of through the control device 300*a*.

Alternatively, when the command for controlling the plurality of electric devices is input to the other control device 300*b*, the control device 300*a* may determine whether the command for controlling the plurality of electric devices is valid, and may perform a corresponding control operation.

When using the other control device 300*b* as described above, the user may simply control a home electric device through a wrist-watch-type device or a TV remote controller.

For example, the user may collectively power off home appliances by saying, to the wrist-watch-type device, "Good night."

The control device 300*a* includes a user interface unit 400, a control unit 350, a storage unit 330, and a communication unit 340.

The user interface unit 400 outputs operation states of pre-registered electric devices among the plurality electric devices disposed in the home, and receives an operation command for at least one of the pre-registered electric devices.

It has been described that the wearable device 300*b*, which is the other control device in the embodiment, controls a home electric device through the control device 300*a*. However, the electric device may be directly controlled over a network by the wearable device 300*b*, which is the other control device, without the control device 300*a*.

The user interface unit 400 includes a display unit for displaying the operation states of the pre-registered electric devices, and an input unit for receiving the operation command from the user.

Here, the input unit is a touch panel for receiving an operation command, and the user interface unit 400 may be implemented as a touch screen in which a display panel of the display unit and the touch panel of the input unit are integrally formed.

In addition, the input of the input unit may be received through an electronic pen, a pointing device (e.g., mouse, etc.), a keyboard, voice recognition, and gesture recognition in addition to the touch panel.

In this case, the input unit may be formed separately from the display panel of the display unit. However, when the input unit is a touch type electronic pen, the input unit may be formed integrally therewith.

The user interface unit 400 includes a home screen on which icons for various apps are displayed.

The user interface unit 400 displays an icon of an app for monitoring and controlling an electric device on the home screen, transmits an app selection signal to the control unit 350 when the icon of the app is selected by the user, and displays a screen corresponding to execution of the app on the basis of a command of the control unit 350.

When the app is executed, the control unit 350 controls the user interface unit 400 such that operation states of pre-registered electric devices are output, and controls transmission of a signal corresponding to an operation command for at least one electric device on the basis of an operation command input to the user interface unit 400 by touch.

The control unit 350 determines an operation command for an electric device transmitted from the other control device 300*b* and controls an operation of the electric device on the basis of the determined operation command for the electric device.

When an icon 411 is touched, the control unit 350 performs control to switch the dashboard screen into a control screen. When a state window 412 is touched, the control unit 350 performs control to switch a current state into another state.

Furthermore, when the icon 411 is touched, the control unit 350 may perform control such that a mini control window is displayed to overlap an overview unit of the dashboard screen.

Here, the state window 412 is a window on which an on-command or an off-command is displayed. When the state window is touched during an on state, the control unit 350 performs control to switch the state window to an off state. When the state window is touched during an off state, the control unit 350 performs control to switch the state window to an on state.

When a viewfinder of a camera is executed, the control unit 350 performs control to display the execution of the viewfinder of the camera on the dashboard screen, recognizes an electric device from an acquired image, checks a control screen corresponding to the recognized electric device, and performs control to switch the dashboard screen to the control screen.

The storage unit 330 stores identification information of home electric devices registered by the user and an app for monitoring and controlling the pre-registered electric devices.

The storage unit 330 stores an operation command for a pre-registered electric device for each button of a master key 420, and stores an operation command for an electric device of a chatting unit 430.

The communication unit 340 communicates with the pre-registered electric devices and the other control device 300*b*.

Furthermore, the communication unit 340 may also communicate with the home server.

An implementation of a user interface unit 400 of a control device according to another embodiment will be described with reference to FIGS. 23 to 26.

Figure 22:
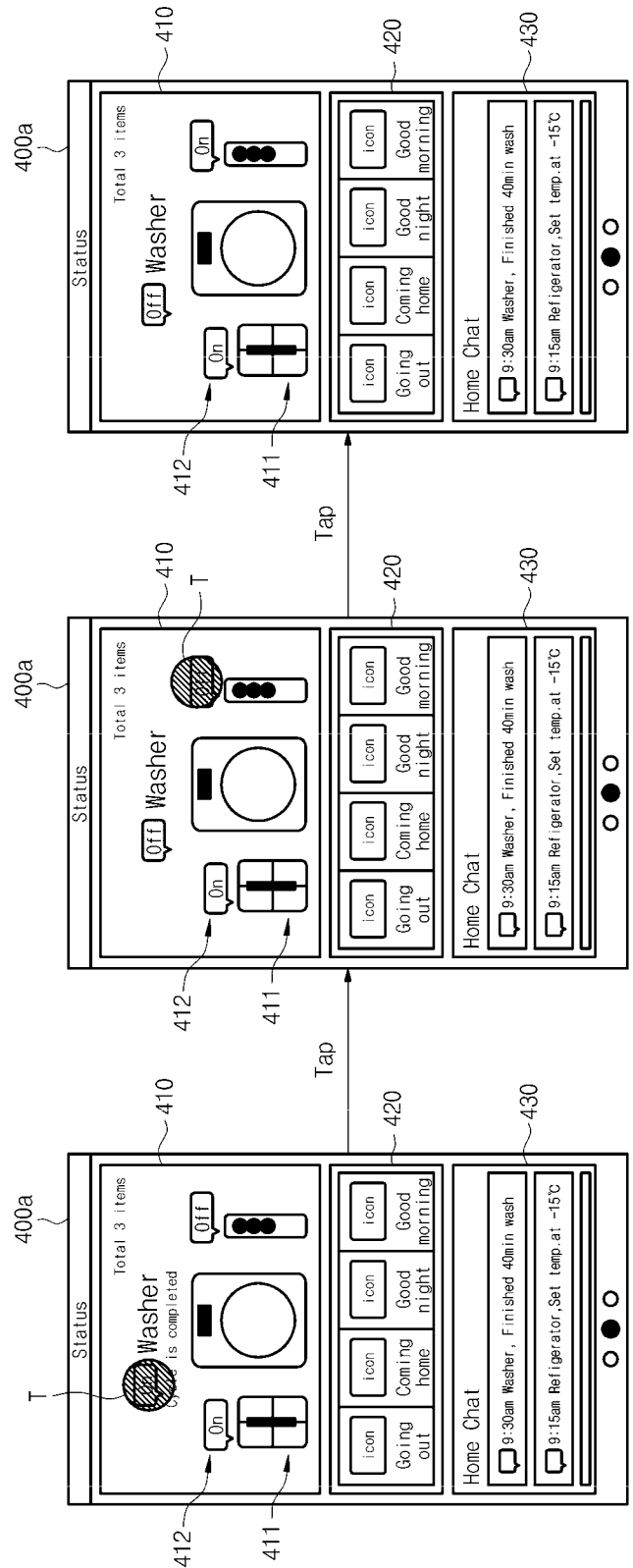
FIG. 22 is an exemplary diagram showing a state window of a user interface unit provided in the control device according to another embodiment.

FIG. 22 is an exemplary diagram of a dashboard screen 400*a* displayed on the user interface unit 400 of the control device according to another embodiment. The dashboard screen 400*a* will be described with reference to FIGS. 23, 24, 25, 26, and 27.

The dashboard screen 400*a* of the control device includes an overview unit 410 for displaying an icon and an operation state of a pre-registered electric device, a master key 420 for operating the pre-registered electric device on the basis of a preset operation command, and a chatting unit 430 for displaying a current operation state or last operation state of each electric device displayed in the overview unit 410 and chatting with at least one electric device selected among the electric devices displayed in the overview unit 410. Among these, the overview unit 410 will be described in detail.

The overview unit 410 displays a list of pre-registered electric devices and also displays an icon 411 of each of the pre-registered electric devices and a state window 412 that informs about a current operation state of the pre-registered electric devices.

Generally, the state window 412 is positioned in the vicinity of the icon 411 and thus may be easily recognized by the user. However, the state window 412 is not limited in a position or shape as long as the user can be aware of the association with the icon 411 (e.g., a region in which only separate state windows are put together is included, and each state window additionally display an electric device associated with the state window).

The icon 411 and the state window 412 function as buttons for setting an operation of an electric device.

In detail, the icon 411 is a button for instructing to switch the screen to a control screen for controlling a detailed operation of the electric device, and the state window 412 is a button for controlling a simple operation such as on/off of the electric device.

Here, the detailed operation may be understood as including one or more control operations in addition to the simple operation.

That is, the controlling of the detailed operation includes controlling an additional operation in addition to the simple operation.

For example, the controlling of the detailed operation may be understood as the controlling of all controllable operations of the electric device, and the controlling of the simple operation may be understood as the controlling of another operation in addition to an on/off operation of the electric device.

In addition, the simple operation may include operations (e.g., an on/off operation) that are changeable by one manipulation, and the detailed operation may include operations (e.g., temperature adjustment, washing course control, etc.) that need to be manipulated or changed in multiple stages.

The simple operation and the detailed operation may be set in advance for each electric device when the app is produced or may be set in advance for each electric device when the electric device is produced. In addition, the user may arbitrarily set and modify the simple operation and the detailed operation.

The state window 412 may be displayed as a speech bubble or slide switch.

Figure 23:
FIGS. 23 to 27 are exemplary diagrams showing an input/output of a user interface unit provided in a control device according to another embodiment.
Figure 23:

As shown in portion (a) of FIG. 23, the speech bubble displays an on or off operation through tapping. As shown in portion (b) of FIG. 23, the slide switch displays an on or off operation through touch-sliding.

On a condition that the icons of the refrigerator, the washing machine, and the air conditioner are displayed, when a speech bubble of the washing machine that is powered on is touched (T), the overview unit 410 utilizes the speech bubble to inform that the refrigerator is powered off while performing control such that the refrigerator is powered off. In this condition, when a speech bubble of the air conditioner that is powered off is touched (T), the overview unit 410 utilizes the speech bubble to inform that the air conditioner is powered on while performing control such that the air conditioner is powered on.

In addition, the chatting unit 430 displays completion information of the washing machine, a set temperature of the air conditioner, etc. That is, information that is difficult to display through the state window (e.g., a speech bubble, etc.) may be separately displayed through the chatting unit.

Figure 24:
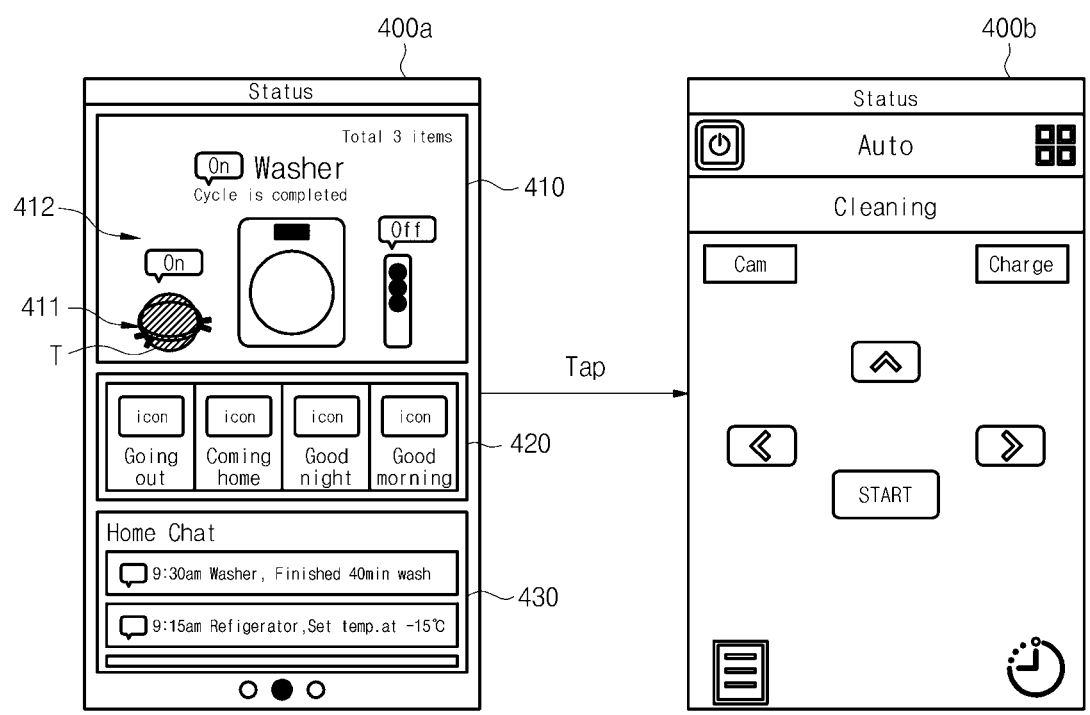

As shown in FIG. 24, when the icon 411 is tapped, the dashboard screen 400*a* of the control device is switched to the control screen 400*b* for controlling an electric device of the tapped icon in detail.

Here, when the dashboard screen 400*a* is switched to the control screen, the switching may be performed through a shake operation or a long tapping operation rather than the tapping operation.

Here, as shown in FIG. 24, the switching to the control screen may include moving the entire screen to another control screen and displaying a pop-up window in a region of the dashboard screen.

For the robot cleaner, the detailed control may include a cleaning time, a cleaning reservation, a cleaning mode, etc. For the washing machine, the detailed control may include an operation course, an operation reservation, etc. For the air conditioner, the detailed control may include an operation mode, a target temperature, operation reservation, etc.

For example, when the icon 411 of the robot cleaner on the dashboard screen 400*a* is tapped, the control device displays the control screen 400*b* for controlling the robot cleaner in detail.

Furthermore, the control device displays a current operation mode (Cleaning), buttons (Cam and Charge) of changeable operation modes, movement direction buttons, and a start button, etc.

Figure 25:
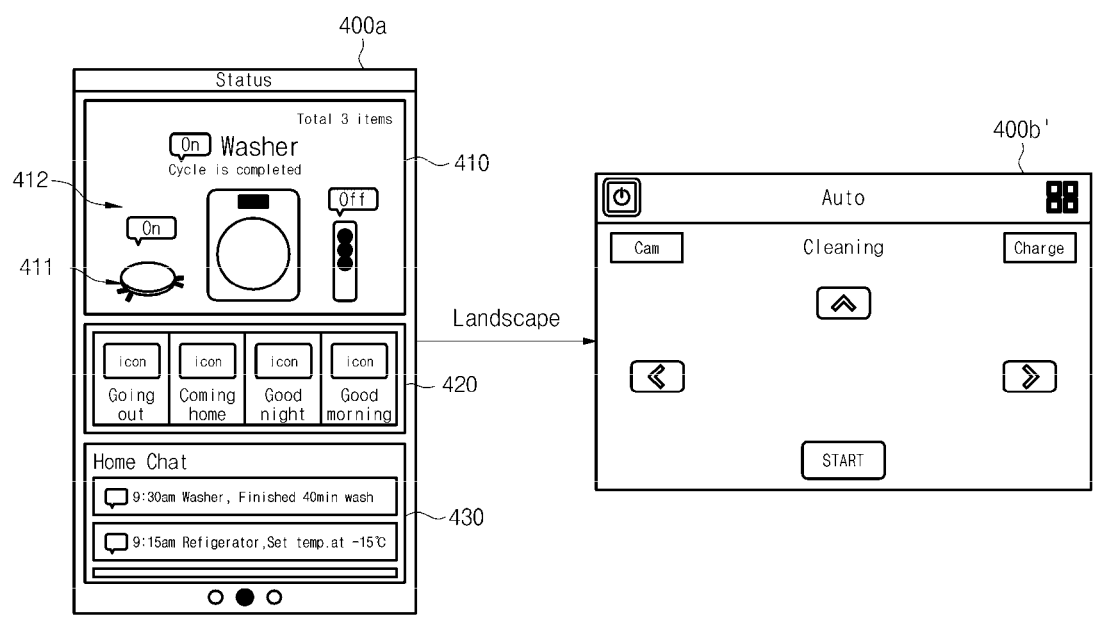

As shown in FIG. 25, the control device may display the control screen as a landscape mode control screen 400*b*' in response to rotation of the control device.

Furthermore, when the input of the operation command is completed, the control device displays the dashboard screen and may switch a screen mode to a portrait mode and display a portrait mode dashboard screen.

In addition, irrespective of the rotation of the control device, the control device may display the screen mode as the landscape mode control screen 400b' when the control screen is displayed.

Figure 26:
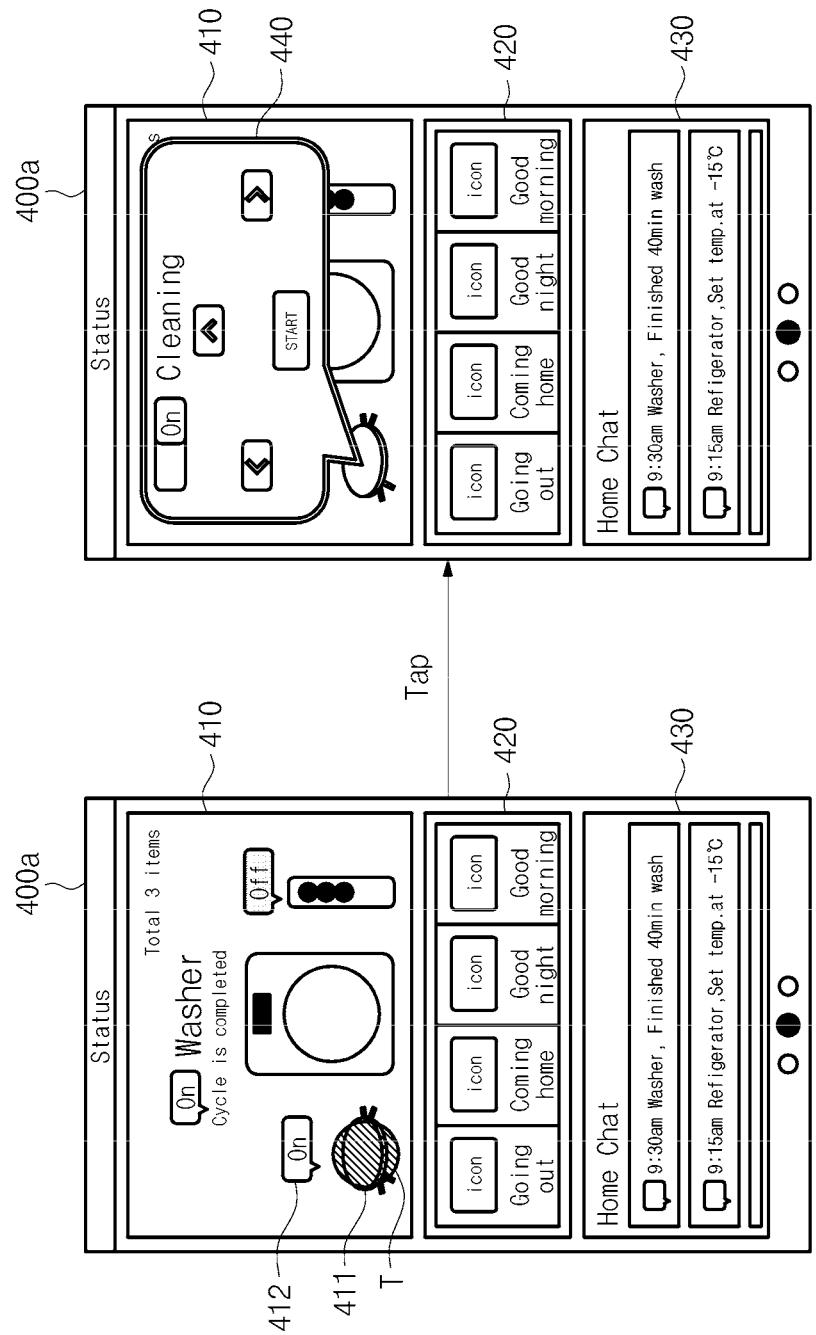

As shown in FIG. 26, the control device may display a mini control window 440, which is formed by reducing the control screen, over the overview unit 410 of the dashboard screen.

For example, when the icon 411 of the robot cleaner on the dashboard screen 400a is tapped, the control device displays the mini control window 440 for controlling the robot cleaner in detail on the overview unit 410.

Furthermore, the control device displays a current operation mode Cleaning, movement direction buttons, and a start button, etc. in the mini control window 440.

Figure 27:
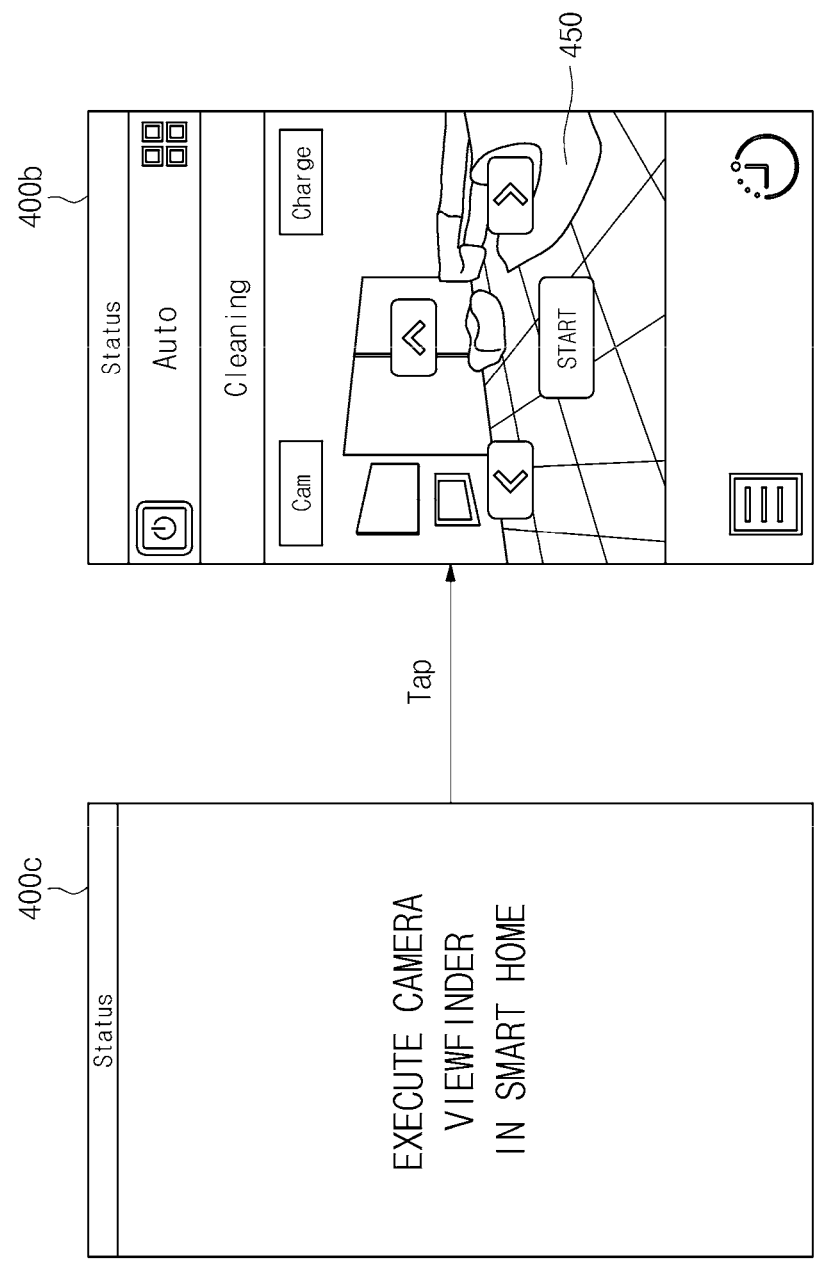

FIG. 27 is an exemplary diagram of a dashboard screen 400 of a control device according to another embodiment.

When the viewfinder of the camera provided in the control device is executed, the control device displays a camera viewfinder execution window 400c on the dashboard screen, acquires a home image, recognizes an electric device from the acquired image, and switch the dashboard screen of the control device to a control screen 400b for the recognized electric device.

An acquired image 450 is displayed together on the control screen 400b of the control device. In this case, an operation command button or the like is displayed on the control screen 400b to overlap the acquired image 450.

For example, the control device displays the camera viewfinder execution window 400c on the dashboard screen. When an image of a robot cleaner in the home is acquired, the control device switches the camera viewfinder execution window 400c to the control screen 400b and displays an operation command button for controlling the robot cleaner on the control screen 400b in addition to the acquired home image.

Alternatively, only the control screen rather than being displayed together with the acquired image 450 is displayed on the control screen 400b of the control device.

For example, when the washing machine is recognized through the viewfinder of the control device, only the control screen for the washing machine is displayed.

Alternatively, when a specific electric device is recognized through the viewfinder of the control device, an app for controlling a related electric device may be displayed on the control device, instead of the control screen 400b. In detail, an initial screen of the app may be displayed, or a screen including a pop-up window for controlling the recognized device may be displayed similarly to that shown in FIG. 26.

When a plurality of devices are recognized through the viewfinder of the control device, the control device may allow a user to select a device to be controlled.

The device recognition through the image may be achieved by performing comparison with data stored in the control device, the home server, or an external server.

Figure 28:
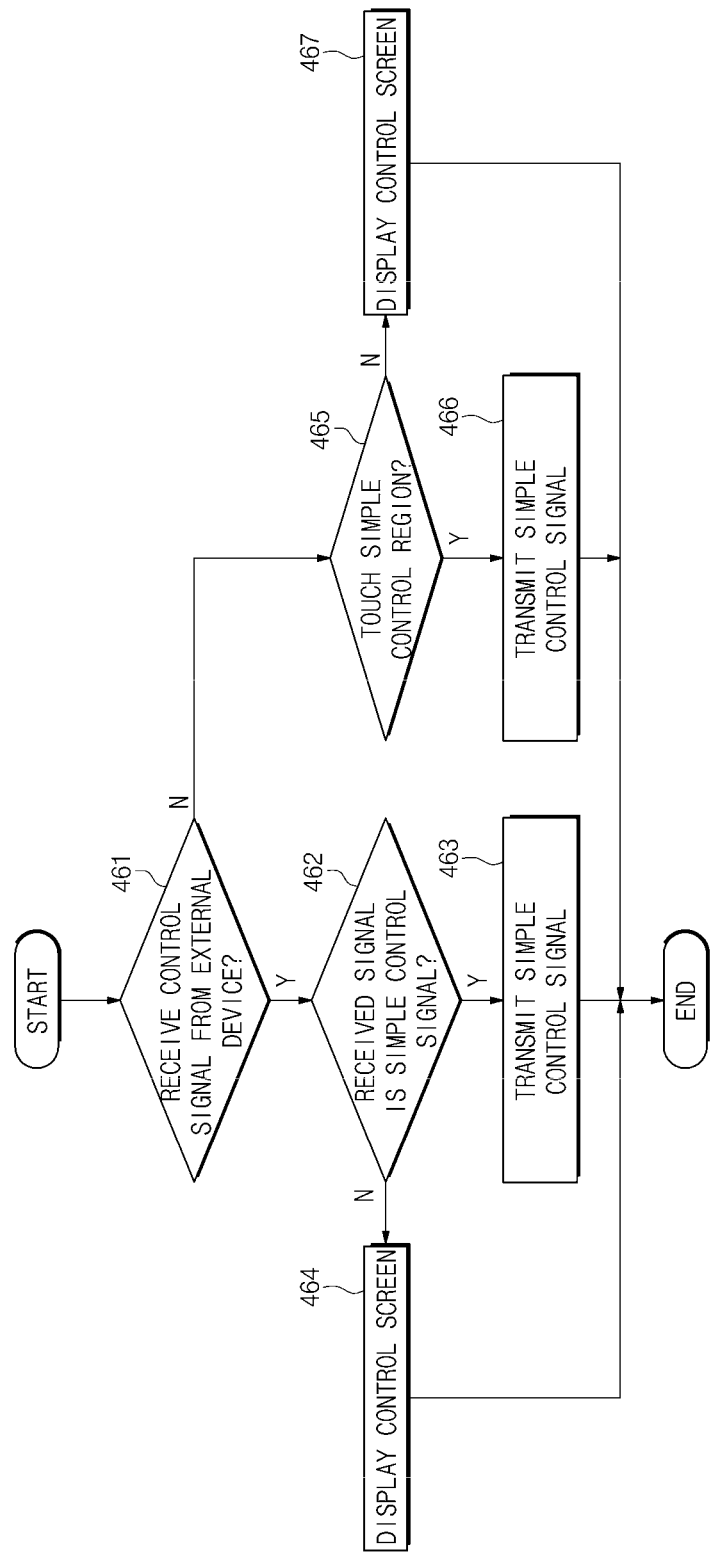
FIG. 28 is a control flowchart of a control device according to another embodiment.

FIG. 28 is a control flowchart of a control device according to another embodiment.

A control device 300a determines whether a control signal is received from another control device, which is an external device (461).

Furthermore, the determination of whether the control signal is received from another control device 300b may be omitted when the control is performed using only the control device 300a rather than the other control device 300b.

When it is determined that the control signal is received from the other control device 300b, which is an external device, the control device determines whether the received control signal is a simple control signal (462).

When it is determined that the received control signal is the simple control signal, the control device transmits the simple control signal to an electric device (463). When it is determined that the received control signal is not the simple control signal, the control device displays a control screen for performing detailed control (464).

Here, the simple control signal is an on/off signal, and the detailed control signal is an operation control signal other than the on/off signal.

When the control screen is displayed, the control device may change a screen mode of the user interface unit to a landscape mode and then display the control screen.

The control device determines whether a simple control region has been touched by the user (465).

The determination of whether the simple control region has been touched includes determining whether the touched region is a region of the state window of the electric device.

When the state window is touched, the control device changes operation text of a state window.

That is, when a state window of any electric device is touched during an on state, the state window displays an off state. When the state window of the electric device is touched during an off state, the state window displays an on state.

On the other hand, when it is determined that the touched region is a region of an icon of the electric device, the control device determines that a detailed control region has been touched.

When it is determined that the simple control region has been touched, the control device transmits a simple control signal to the electric device (466). When it is determined that the simple control region has not been touched, the control device displays a control screen for performing detailed control (467).

Here, the simple control signal is an operation on/off signal, and the detailed control signal is an operation control signal other than the operation on/off signal.

The transmission of the simple control signal includes transmitting an off control signal when the current state is an on state and transmitting an on control signal when the current state is an off state.

In addition, when a camera viewfinder mode is input, the control device acquires a home image, recognizes an electric device from the acquired image, and displays a control screen for controlling the recognized electric device on a user interface unit, and may display the control screen over the acquired home image.

The invention claimed is:

1. A control device comprising:
   a user interface; and
   a processor configured to:
   control the user interface to display a first screen comprising icons of electric devices registered with the control device and a state window for each of the icons,
   in response to an icon among the icons displayed on the first screen being touched in a first touch type, control the user interface so that the first screen is changed to a control screen for controlling an electric device corresponding to the icon,
   in response to the icon being touched in a second touch type, control the user interface to display a mini control window for controlling the electric device corresponding to the icon on the first screen such that the mini control window overlaps the first screen, and in response to the state window associated with the icon being touched, transmit an operation control signal to the electric device for switching from a current operation of the electric device to another operation, and control the user interface such that information corresponding to the current operation displayed in the state window of the first screen is changed to information corresponding to the other operation.

2. The control device of claim 1, wherein the state window associated with the icon comprises a speech bubble displaying an operation text corresponding to one of the information corresponding to the current operation and the information corresponding to the other operation in response to a touch input thereto.

3. The control device of claim 1, wherein the state window associated with the icon comprises a sliding switch to switch an operation state of the electric device between the current operation and the other operation in response to a sliding touch input thereto.

4. The control device of claim 1, further comprising a storage configured to store information of the electric devices registered with the control device and an application for monitoring and controlling the electric devices.

5. The control device of claim 1, further comprising a communicator configured to communicate with the electric devices.

6. The control device of claim 1, further comprising:
a communicator configured to communicate with another control device,
wherein the processor is further configured to control an operation of the electric device based on an operation command transmitted by the other control device.

7. The control device of claim 1, wherein the processor is further configured to:
recognize the electric device from an image acquired through a camera, and
control the user interface to display the control screen for controlling the electric device.

8. The control device of claim 7, wherein the processor is further configured to control the user interface to display the control screen to overlap the image.

9. A control method of a control device, the control method comprising:
displaying a first screen on a user interface of the control device, the first screen comprising icons of electric devices registered with the control device and a state window for each of the icons;
in response to an icon among the icons displayed on the first screen being touched in a first touch type, displaying the first screen as a control screen for controlling an electric device corresponding to the icon;
in response to the icon being touched in a second touch type, displaying a mini control window for controlling the electric device corresponding to the icon touched in the second touch type such that the mini control window overlaps the first screen; and
in response to the state window associated with the icon being touched, performing a simple control to switch a first operation state of the electric device to a second operation state,
wherein the state window displays an operation text corresponding to one of the first operation state and the second operation state, and
wherein the performing of the simple control comprises:
transmitting a first operation control signal corresponding to the first operation state to the electric device in response to the state window being touched while the electric device is in the second operation state, and
transmitting a second operation control signal corresponding to the second operation state to the electric device in response to the state window being touched while the electric device is in the first operation state.

10. The control method of claim 9, further comprising:
in response to an operation command for one of the electric devices being transmitted from an external device, determining whether the operation command comprises a simple control signal or a detailed control signal;
in response to the operation command comprising the simple control signal, changing a state window associated with the one of the electric devices and transmitting an operation switching signal corresponding to the changed state window to the one of the electric devices; and
in response to the operation command comprising the detailed control signal, displaying a control screen for controlling the one of the electric devices and transmitting a selected operation control signal to the one of the electric devices.

11. The control method of claim 9, further comprising:
in response to a camera viewfinder mode being input, acquiring a home image;
recognizing one of the electric devices from the home image;
displaying a control screen for controlling the recognized one of the electric devices; and
displaying the control screen for controlling the recognized one of the electric devices over the home image.

* * * * *